United States Patent [19]
Kubo

[11] Patent Number: 6,011,597
[45] Date of Patent: Jan. 4, 2000

[54] SIGNAL RECEIVING APPARATUS AND SIGNAL RECEIVING SYSTEM

[75] Inventor: Kazuharu Kubo, Kawasaki, Japan

[73] Assignee: Fujitsu Limited, Kanagawa, Japan

[21] Appl. No.: 08/803,064

[22] Filed: Feb. 20, 1997

[30] Foreign Application Priority Data

Jun. 8, 1996 [JP] Japan .................................. 8-207476

[51] Int. Cl.[7] ............................ H04N 7/20; H04N 7/167; H04N 7/173
[52] U.S. Cl. ................................ 348/725; 348/3; 348/10; 348/7; 348/11; 348/12; 348/13; 455/3.1; 455/3.2; 455/4.1; 455/4.2; 455/6.2; 455/6.3; 455/5.1
[58] Field of Search ................................ 348/3, 7, 10, 11, 348/12, 13; 455/3.1, 3.2, 4.1, 4.2, 5.1, 6.2, 6.3; H04N 7/20, 7/167, 7/173

[56] References Cited

U.S. PATENT DOCUMENTS

| | | | |
|---|---|---|---|
| 3,909,542 | 9/1975 | Wunluck et al. | 179/18 AH |
| 4,901,147 | 2/1990 | Tajima | 358/139 |
| 5,345,591 | 9/1994 | Tsurumaki et al. | 455/3.2 |
| 5,483,662 | 1/1996 | Nonoyama et al. | 455/3.2 |
| 5,504,934 | 4/1996 | Imai | 455/3.2 |
| 5,517,685 | 5/1996 | Aoyama et al. | 455/260 |
| 5,600,336 | 2/1997 | Kubo et al. | 343/756 |
| 5,752,180 | 5/1998 | Guo et al. | 455/319 |

*Primary Examiner*—John K. Peng
*Assistant Examiner*—Eric Ferguson
*Attorney, Agent, or Firm*—Helfgott & Karas, P.C.

[57] ABSTRACT

The present invention relates to a signal receiving apparatus and a signal receiving system, including a receive antenna for receiving plural high-frequency signals; first frequency converters each for down-converting a frequency of each of the plural high-frequency signals; second frequency converters each for further frequency-converting the signals converted by means of the first frequency converters; a frequency control information storage section for storing frequency control information used to perform a frequency conversion by the plural second frequency converters; a frequency-conversion control section for automatically controlling the frequency conversion by said plural second frequency converters based on the frequency control information; and a receiver for receiving only a signal of a desired frequency among signals frequency-converted by plural second frequency converters. In the signal receiving apparatus used suitably as a receive-only station which receives high-frequency signals from a communications satellite, the object is to reduce significantly troubles in the setting and control for signal receiving operation, thus leading to miniaturization of the device or system and cost reduction thereof.

11 Claims, 13 Drawing Sheets

FIG. 6

| IC CARD FOR FEBRUARY | | |
|---|---|---|
| IC CARD FOR JANUARY | | |
| IC CARD FOR DECENMBER | | |
| (RECEIVE FREQUENCY – CS TUNER) /V | fo/V | |
| (DAY) 15:00 ———————— | ————— | ———— |
| (DAY) 17:00 ———————— | ————— | ———— |
| (DAY) 19:00 ———————— | ————— | ———— |

64

SIGNAL RECEIVING APPARATUS AND SIGNAL RECEIVING SYSTEM

BACKGROUND OF THE INVENTION

1) Field of the Invention

The present invention relates to a signal receiving apparatus and a signal receiving system each of which is suitable for use in television receive-only (TVRO) stations each of which receives high-frequency signals from, for example, a communications satellite.

2) Description of the Related Art

In the satellite broadcasting communications, high-frequency signals transmitted from a signal transmitting station are received by a receive-only station via a communications satellite.

Such a satellite broadcasting communications service includes a BS (Broadcasting Satellite) broadcast, being broadcast communications for public, in which broadcast programs can be always received regardless of slots after a prescribed receiver's contract and CS (Communications Satellite) broadcast, being broadcast communications for corporations, in which limited broadcast programs can be received only for the slot after a receiver's contract effective for a fixed period of time. Different frequency bands are used for the BS broadcast and CS broadcast.

As to the CS communications satellites, four kinds of satellites including JCSAT-1, JCSAT-2, Superbird A, and Superbird B are well known. Each of the communications satellites transmits two kinds of 12-GHz-band high-frequency signals including a V-polarized wave high-frequency signal and an H-polarized wave high-frequency signal. This means that eight kinds of high-frequency signals are transmitted as broadcast high-frequency signals from the four CS-communications satellites.

The CS receive-only station receives only the high-frequency signals from the CS communications satellites. The CS receive-only station has, for example, the configuration shown in FIG. 13.

Referring to FIG. 13, the CS receive-only station 100 includes a dual antenna 101 and low-noise frequency converters (LNB: Low Noise Block-converter) 102A to 102D installed outdoors, together with amplifiers 103A to 103D, variable attenuators 106A to 106D, a variable switching box 107, and CS tuners 114a to 114f installed indoors.

The dual antenna 101, which receives four kinds of high-frequency signals among eight kinds of 12-GHz-band high-frequency signals transmitted from four satellites, has, for example, a caliber of 2.4 m.

Explanation will be made below on the case where the dual antenna 101 receives V-polarized and H-polarized wave high-frequency signals transmitted from each of JCSAT-1 and JCSAT-2 as four kinds of high-frequency signals.

Four LNBs 102A to 102D are arranged corresponding to respective four 12-GHz-band high-frequency signals received by the dual antenna 101. Each of the LNBs 102A to 102D down-converts the frequency of a different high-frequency signal respectively input thereto by a fixed frequency (e.g. 11.3 GHz) to obtain a 1-GHz-band signal.

For example, LNB 102A receives a V-polarized wave high-frequency signal from JCSAT-1. LNB 102B receives a H-polarized wave high-frequency signal from JCSAT-1. LNB 102C receives a V-polarized wave high-frequency signal from the JCSAT2. LNB 102D receives a H-polarized wave high-frequency signal from the JCSAT2.

Thus, the high-frequency signals input to the LNBs 102A to 102D are down-converted by a fixed frequency, respectively. Then the converted signals are respectively output to the amplifiers 103A to 103D while the noise component included in each converted signal is reduced.

Further, the amplifier 103A amplifies the signal down-converted by the LNB 102A. The amplifier 103B amplifies the signal down-converted by the LNB 102B. The amplifier 103C amplifies the signal down-converted by the LNB 102C. The amplifier 103D amplifies the signal down-converted by the LNB 102D. Each of the amplifiers 103A to 103D includes a booster amplifier 104 which amplifies the input signal and a booster amplifier power supply (booster amplifier PS) 105 which supplies electric power to the booster amplifier 104.

In such an arrangement, the signal transmission loss caused by the thickness and length of the transmission cable can be reduced by amplifying the signals from the LNBs 102A to 102D by means of the amplifiers 103A to 103D, respectively, while a signal degradation caused by the signal distribution in the variable switching box 107 at the rear stage can be reduced.

Further, the variable attenuator 106A attenuates the signal amplified by the amplifier 103A to a predetermined value to adjust finely the level of the signal input to the switching box 107. The variable attenuator 106B attenuates the signal amplified by the amplifier 103B to a predetermined value to adjust finely the level of the signal input to the switching box 107. The variable attenuator 106C attenuates the signal amplified by the amplifier 103C to a predetermined value to adjust finely the level of the signal input to the switching box 107. The variable attenuator 106D attenuates the signal amplified by the amplifier 103D to a predetermined value to adjust finely the level of the signal input to the switching box 107.

The variable switching box 107 switches to input signals from the variable attenuators 106A to 106D to predetermined CS tuners 114a to 114f, according to a signal receiver's contract held in the receive-only station 100.

The variable switching box 107 consists of distributors 108A to 108D which distribute respectively the signals input from the variable attenuators 106A to 106D to the CS tuners 114a to 114f, switches 109a to 109f which switch to turn on or off the signals distributed by each of the distributors 108A to 108D to the CS tuners 114a to 114f, and amplifiers 113a to 113f which respectively amplify the signals switched through the on/off operation of the switches 109a to 109f.

Further, the CS tuners 114a to 114f are receive tuners each of which receives a signal from each of the variable attenuators 106A to 106D switched by means of the variable switching box 107. In each of the CS tuners 114a to 114f, any one of the frequencies of four kinds of signals from the LNBs 102A to 102D is arbitrarily set as a receive frequency to receive the signal corresponding to the set receive frequency.

In the receive-only station 100 shown in FIG. 13, four CS tuners 114a to 114d are arranged as a working tuner. The CS tuners 114e and 114f are arranged as backup (spare) systems for the CS tuners 114a to 114d.

Here, the signal switching control of the variable switching box 107 to the CS tuners 114a to 114d will be described below.

For example, it is assumed that a receiver's contract is made on conditions that V-polarized wave signals transmitted from JCSAT-1 can be received for a predetermined period of time and that the signals are received with the CS tuner 114a among plural CS tuners 114a to 114d installed inside a building. In this case, a switch 109a is turned on to connect the variable attenuator 106A with the CS tuner 114a. The receive frequency of the CS tuner 114a is set to the frequency of the signal down-converted by means of the LNB 102A (to the frequency of the signal corresponding to the V-polarized wave signal of the JCSAT-1).

When it is desired that the CS tuner 114b installed at another place receives the V-polarized wave signal from JCSAT-1 during the period for which the receiver's contract is valid to receive it, a switch 109b is turned on to connect the variable attenuator 106B with the CS tuner 114b while the receive frequency of the CS tuner 114b is set to the frequency of the signal down-converted by the LNB 102A (to the frequency of the signal corresponding to the V-polarized wave signal of JCSAT-1).

When the period defined by the receiver's contract ends, the CS tuners 114a to 114d cannot receive the V-polarized wave signals from JCSAT-1.

In such a state, according to the communications satellite signal receiver's contract, the CS tuners 114a to 114d can receive four kinds of signals from the communications satellites by setting the receive frequency thereof under the signal switching control of the variable switching box 107.

In the same manner as that described above, when two communications satellites use high-frequency signals of the same frequencies (in other words, the same transponders are used), the CS tuners 114a to 114d can receive any one of four kinds of signals from the communications satellites under signal switching control of the variable switching boxes 107.

In the receive-only station 100 shown in FIG. 13, the CS tuners 114a to 114d are in service, whereas the CS tuners 114e and 114f are spare. Hence, the corresponding switches 109a to 109d and the amplifiers 113a to 113d are in service, whereas the switches 109e and 109f and the amplifiers 113e and 113f are spare.

In such an configuration, when each of the communications satellites JCSAT-1 and JCSAT-2 transmits V-polarized wave high-frequency signals and H-polarized wave high-frequency signals, the dual antenna 101 in the receive-only station 100 shown in FIG. 13 receives the four kinds of high-frequency signals transmitted. After the high-frequency signals are subjected to a predetermined process using the LNBs 102A to 102D, the amplifiers 103A to 103D, and the attenuators 106A to 106D, the processed signals are switched by means of the variable switching box 107. Then a predetermined one of the CS tuners 114a to 114d acting as a working tuner receives the switched one.

However, the problem is that since the variable switching box 107 in the receive-only station 100 shown in FIG. 13 includes four distributors 108A to 108D, the circuit configuration becomes large and complicated, thus it requires a considerable large installation space.

Moreover, many switches for signal switching operation arranged in the variable switching box 107 tends to cause erroneous switch-setting, slow switch setting, and occurrence of troubles such as failure. It cannot be ignored that maintenance costs of the variable switching box 107 is increased.

When the signal to be received by the CS tuners 114a to 114d is switched, the variable switching box 107 switches the signal while it must vary the set value of the receive frequency of each of the CS tuners 114a to 114d.

In this case, where the variable switching box 107 and the CS tuners 114a to 114d, for example, are installed at a different place in a building or where signals to be received by means of CS tuners 114a to 114d are necessary to be switched many times a day, both the switching operation of the variable switching box 107 and the setting of the receive frequency of each of the CS tuners 114a to 114d must be changed. Hence, the problem is that it is very troublesome to execute the receive signal switching operation.

In order to reduce such a trouble, it is considered that personal computers, for example, are respectively connected as monitoring control devices to the CS tuners 114a to 114d to monitor controllably them by remote control. However, connecting personal computers to the CS tuners 114a to 114d respectively results in an increased cost of the system construction.

In contrast, it may be considered that a sole personal computer, for example, is connected as the monitoring control device to the CS tuners 114a to 114d via a bus to monitor and control them by one operation.

However, in constructing such a system, an interface circuit needs to be arranged which connects the personal computer with the CS tuners 114a to 114d via a bus, in each of the CS tuners 114a to 114d. Hence, it is difficult to construct the system using existing CS tuners 114a to 114d. Like the above-described case, the problem is that the cost of the system construction is increased.

As described above, since the distributors 108A to 108D degrade the signals in the variable switching box 107, the amplifiers 103A to 103D arranged at the front stage, as shown in FIG. 13, amplify the signals, respectively. However, the problem is that arranging the amplifiers 103A to 103D leads to an increased cost.

SUMMARY OF THE INVENTION

The present invention is made to overcome the above mentioned problems. An object of the present invention is to provide a signal receiving apparatus which can facilitate the setting and control for signal reception while maintaining the current signal receiving performance, and can significantly reduce the man-hour for a signal-receive setting and controlling operation, whereby miniaturization of devices and systems and cost reduction can be realized.

Another object of the present invention is to provide a signal receiving system which can facilitate the setting and control for signal reception while maintaining the current signal receiving performance, and can significantly reduce the man-hour for a signal-receive setting and controlling operation, whereby miniaturization of devices and systems and cost reduction can be realized.

In order to achieve the above objects, according to the present invention, the signal receiving apparatus is characterized by a receive antenna for receiving plural high-frequency signals; plural first frequency converters arranged corresponding to high-frequency signals received by the receive antenna, each for down-converting the frequency of each of the plural high-frequency signals by a predetermined frequency; plural second frequency converters for further frequency-converting the signals converted by means of the plural first frequency converters; a frequency control information storage section for storing frequency control information used to perform a frequency conversion by the plural second frequency converters; a frequency-conversion control section for automatically controlling the frequency conversion by the plural second frequency converters based on the frequency control information stored in the frequency control information storage section; and at least one receiver for receiving only a signal of a desired frequency among the signals frequency-converted by plural second frequency converters.

According to the signal receiving apparatus of the present invention, plural second frequency converters convert automatically and respectively the frequencies of signals input from plural first frequency converters into receive frequencies preset in the receiver, under control of the frequency-conversion control section. Hence, even if a signal receiver's contract causes a change in the receive signal of the receiver, the receiver can receive plural signals from a communications satellite without changing the setting of the receive frequency every time the receive signal changes. The advantage is that miniaturization of the device or system and cost reduction thereof can be realized by significantly reducing troubles in setting and controlling for signal receiving operation.

According to the present invention, the signal receiving system is characterized by at least one signal receiving apparatus including a receive antenna for receiving plural high-frequency signals; plural first frequency converters arranged corresponding to high-frequency signals received by the receive antenna, each for down-converting a frequency of each of the plural high-frequency signals by a predetermined frequency; plural second frequency converters for further frequency-converting the signals converted by means of the plural first frequency converters; and plural receivers each for receiving only a signal of a desired frequency among signals frequency-converted by plural second frequency converters; and a receive frequency control unit including a frequency control information storage section connected to the signal receiving apparatus via a trunk, for storing frequency control information for performing a frequency conversion by means of the plural second frequency converters; and a frequency-conversion control section for automatically controlling the frequency conversion by the plural second frequency converters based on the frequency control information stored in the frequency control information storage section.

According to the signal receiving system of the present invention, a certain receive frequency control unit installed at another spot controls comprehensively respective signal receiving apparatuses. Hence, the advantage is that even if a signal to be received by each signal receiving apparatus is changed with time, plural receivers in each signal receiving apparatus can automatically receive signals without changing the setting of a receive frequency in each of the signal receivers. In addition, there is the advantage in that no need of arranging a receive-frequency control unit for each signal receiving apparatus can contribute to the cost reduction of system configuration.

Furthermore, according to the present invention, the signal receiving system is characterized by at least one signal receiving apparatus including a receive antenna for receiving plural high-frequency signals; plural first frequency converters arranged corresponding to high-frequency signals received by said receive antenna, each for down-converting the frequency of each of the plural high-frequency signals by a predetermined frequency; plural second frequency converters for further frequency-converting the signals converted by means of the plural first frequency converters, respectively; plural variable band-pass filters each for passing only a signal component of a desired frequency by filtering signals frequency-converted by means of the plural second frequency converters and then removing undesired frequency components therein; and plural receivers each for receiving only a signal of the desired frequency among input signals passed through the variable band-pass filters; and a receive-frequency control unit including a frequency control information storage section connected to the signal receiving apparatus via a trunk, for storing frequency control information for performing a frequency conversion by means of the plural second frequency converters; a frequency-conversion control section for automatically controlling the frequency conversion by the plural second frequency converters based on the frequency control information stored in the frequency control information storage section; a filtering control information storage section for storing filtering control information for performing a filtering process by the plural variable band-pass filters; and a filtering control section for automatically controlling the filtering process of the plural variable band-pass filters based on the filtering control information stored in the filtering control information storage section.

According to the signal receiving system of the present invention, a certain receive frequency control unit installed at another spot controls comprehensively respective signal receiving apparatuses. Hence, the advantage is that even if a signal to be received by each signal receiving apparatus is changed with time, plural receivers in each signal receiving apparatus can automatically receive signals without changing the setting of a receive frequency in each of the signal receivers. In addition, there is the advantage in that there is no need of arranging a receive frequency control unit for each signal receiving apparatus. Hence, this can contribute to the cost reduction of system configuration.

BRIEF DESCRIPTION OF THE DRAWINGS

FIG. 6 shows an example of an IC card used in the signal receiving apparatus according to the first embodiment of the present invention;

DESCRIPTION OF THE PREFERRED EMBODIMENTS (a) Explanation of Aspect of the Present Invention First, an aspect of the present invention will be explained by referring to the attached drawings.

Figure 1:
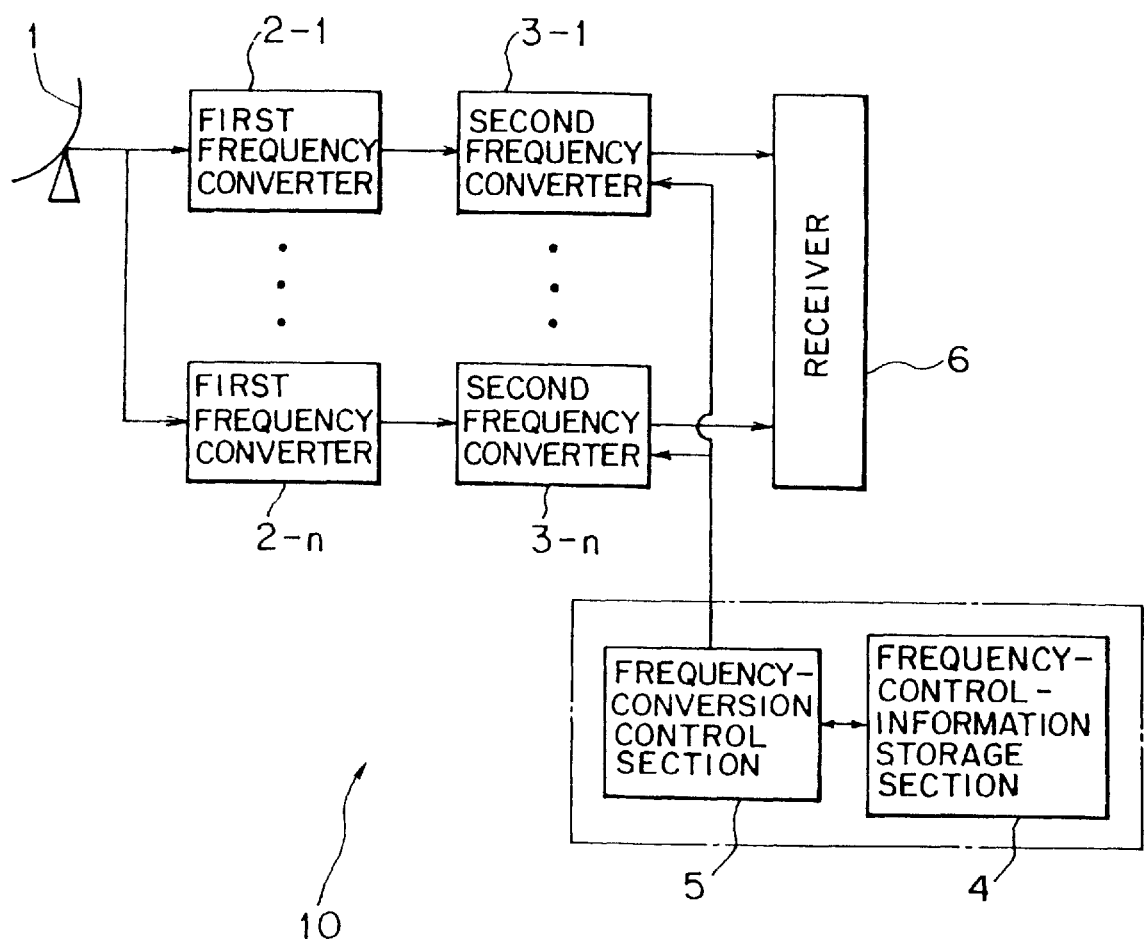
FIG. 1 is a block diagram showing an aspect of the configuration of a signal receiving apparatus according to the present invention.

FIG. 1 is a block diagram showing an aspect of a configuration of a signal receiving apparatus according to the present invention. Referring to FIG. 1, the signal receiving apparatus 10 consists of a receive antenna 1, plural first frequency converters 2-i (i=1, . . . , n), plural second frequency converters 3-i (i=1, . . . , n), a frequency control information storage section 4, a frequency conversion control section 5, and at least one receiver 6.

The receive antenna 1 receives plural high-frequency signals. The first frequency converters 2-i are arranged corresponding to the high-frequency signals received by the receive antenna 1 to down-convert each of plural high-frequency signals by a predetermined frequency. The second frequency converters 3-i further convert the frequency of each of signals converted by means of the plural first frequency converters 2-i.

The frequency control information storage section 4 stores frequency control information for performing a frequency conversion by means of plural second frequency converters 3-i. The frequency conversion control section 5 controls automatically the frequency conversion by plural second frequency converters 3-i based on the frequency control information stored in the frequency control information storage section 4.

The receiver 6 receives only a signal of a desired frequency among signals frequency-converted by means of plural second frequency converters 3-i.

Furthermore, the signal receiving apparatus includes plural variable band-pass filters, arranged in the front stage of the receivers 6, for subjecting respective signals frequency-converted by means of the plural second frequency converters 3-1 to a filtering process to remove undesired frequency components and to pass only signal components of a desired frequency; a filtering control information storage section for storing filtering control information used to execute a filtering process by means of said plural variable band-pass filters; and a filtering control section for automatically controlling the filtering process by the plural variable band-pass filters based on filtering control information stored in the filtering control information storage section.

The signal receiving apparatus includes an inputting section for setting frequency control information which automatically controls the plural second frequency converters 3-i to the frequency control information storage section 4 and for setting filtering control information which automatically controls the variable band-pass filters to the filtering control information storage section.

Moreover, the second frequency converter 3-i is formed of a variable oscillator for generating a variable frequency signal under control of the frequency-conversion control section 5, and a frequency converter for further frequency-converting the signal down-converted by means of a corresponding first frequency converter 2-i by using the variable frequency signal from the variable oscillator.

A hybrid circuit which supplies the signals produced from the plural variable band-pass filters to the receiver 6 is arranged in the front stage of the receiver 6.

Furthermore, the frequency control information is formed of information regarding the plural high-frequency signals, and information regarding a differential between the frequency of a signal converted by the first frequency converter 2-i and the frequency of a signal received in the receiver 6.

The frequency control information storage section 4 stores frequency control information based on a signal receive schedule received by each of the receivers 6. The filtering control information storage section stores the filtering control information based on a signal receive schedule received by each of the receivers 6.

The frequency-conversion control section 5 is connected to the plural second frequency converters 3-i via a trunk. The filtering control section is connected to the variable band-pass filters via a trunk.

The receiver 6 consists of plural receive tuners each of which receives only a signal of a desired frequency, in response to respective signals frequency-converted by the plural second frequency converters 3-i.

In the signal receiving apparatus 10 according to the present invention, plural second frequency converters 3-i convert automatically the frequency of signals input from plural first frequency converters 2-i into the receive frequency preset in the receiver 6, under control of frequency-conversion control section 5. Thus plural signals from a communications satellite can be received without varying the setting of the receive frequency in the receiver 6 every time the signal received by the receiver 6 is changed due to a signal receiver's contract. Hence, the advantage is that miniaturization of the device or system and the cost reduction thereof can be realized while the trouble of the setting and control for signal reception is reduced significantly.

Figure 2:
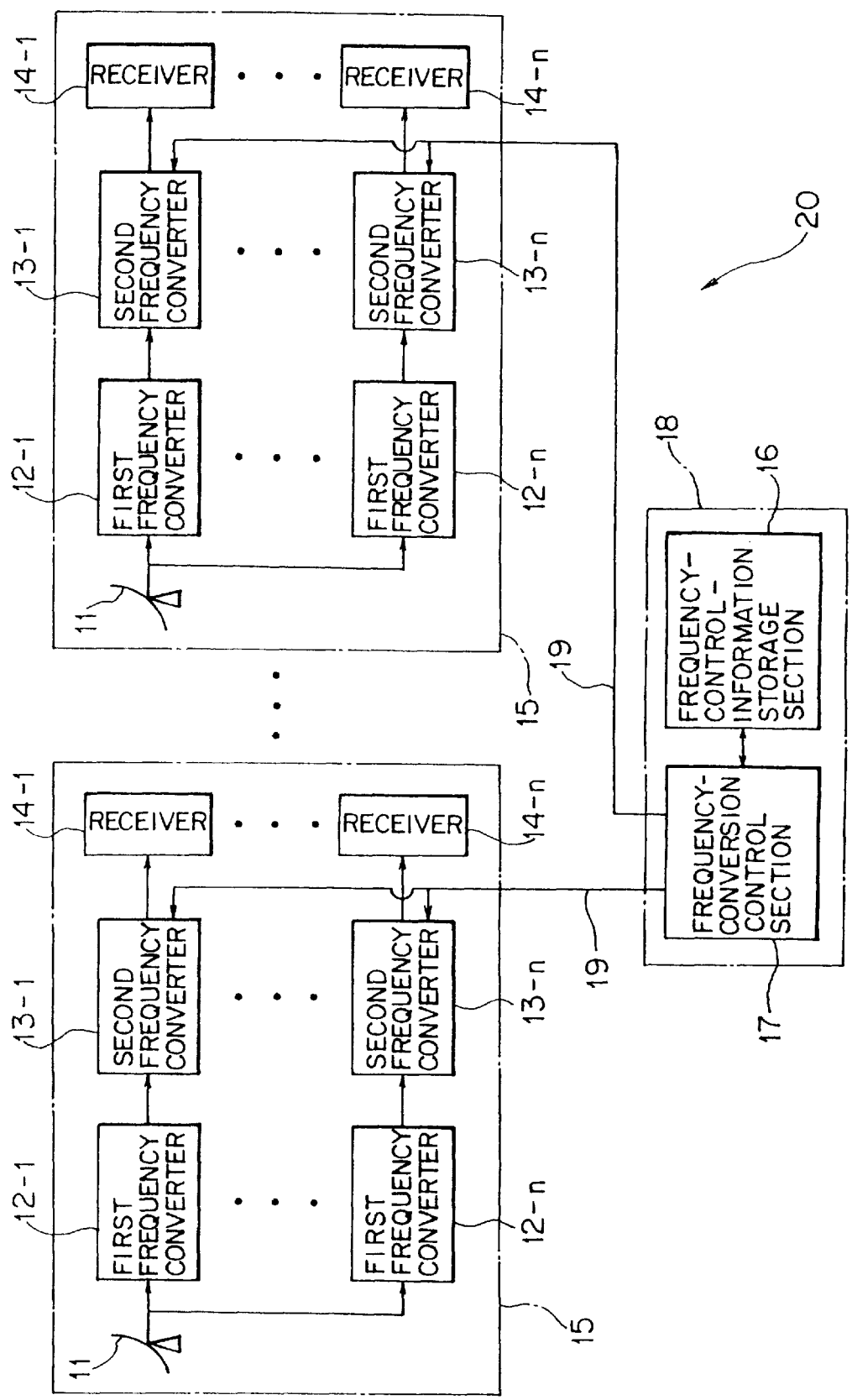
FIG. 2 is a block diagram showing an aspect of the configuration of a signal receiving system according to the present invention.

FIG. 2 is a block diagram showing an aspect of the configuration of a signal receiving system according to the present invention. The signal receiving system 20 shown in FIG. 2 consists of at least one signal receiver 15 and a receive frequency control unit 18.

Each of the signal receiving apparatuses 15 includes a receive antenna 11 which receives plural high-frequency signals; plural first frequency converters 12-i (i=1, . . . , n) arranged corresponding to high-frequency signals received by the receive antenna 11 to down-convert the frequency of each of plural high-frequency signals by a predetermined frequency;

plural second frequency converters 13-i (i=1, . . . , n) to further frequency-convert the signals converted by means of the plural first frequency converters 12-i; and plural receivers 14-k (k=1, . . . , n) each for receiving only a signal of a desired frequency among the signals frequency-converted by the plural second frequency converters 13-i.

The receive-frequency control unit 18 includes a frequency control information storage section 16, connected to the signal receiving apparatus 15 via a trunk 19, for storing frequency control information, for performing a frequency conversion by means of plural second frequency converters 13-i and a frequency-conversion control section 17 for automatically controlling the frequency conversion by the plural second frequency converters 13-i based on the frequency control information stored in the frequency control information storage section 16.

Hence in the signal receiving system 20 according to the present invention, the advantage is that since a receive-frequency control unit 18 at another spot controls comprehensively the signal receiving apparatuses 15, the plural receivers 14-k in each of signal receiving apparatuses 15 can automatically receive signals without changing the setting on the side of each signal receiving apparatus 15 even if the signal to be received by each signal receiving apparatus 15 is changed according to time. In addition, there is the advantage of contributing to the cost reduction of the system construction because the dedicated receive frequency control unit is not needed for each signal receiving apparatus 15.

Figure 3:
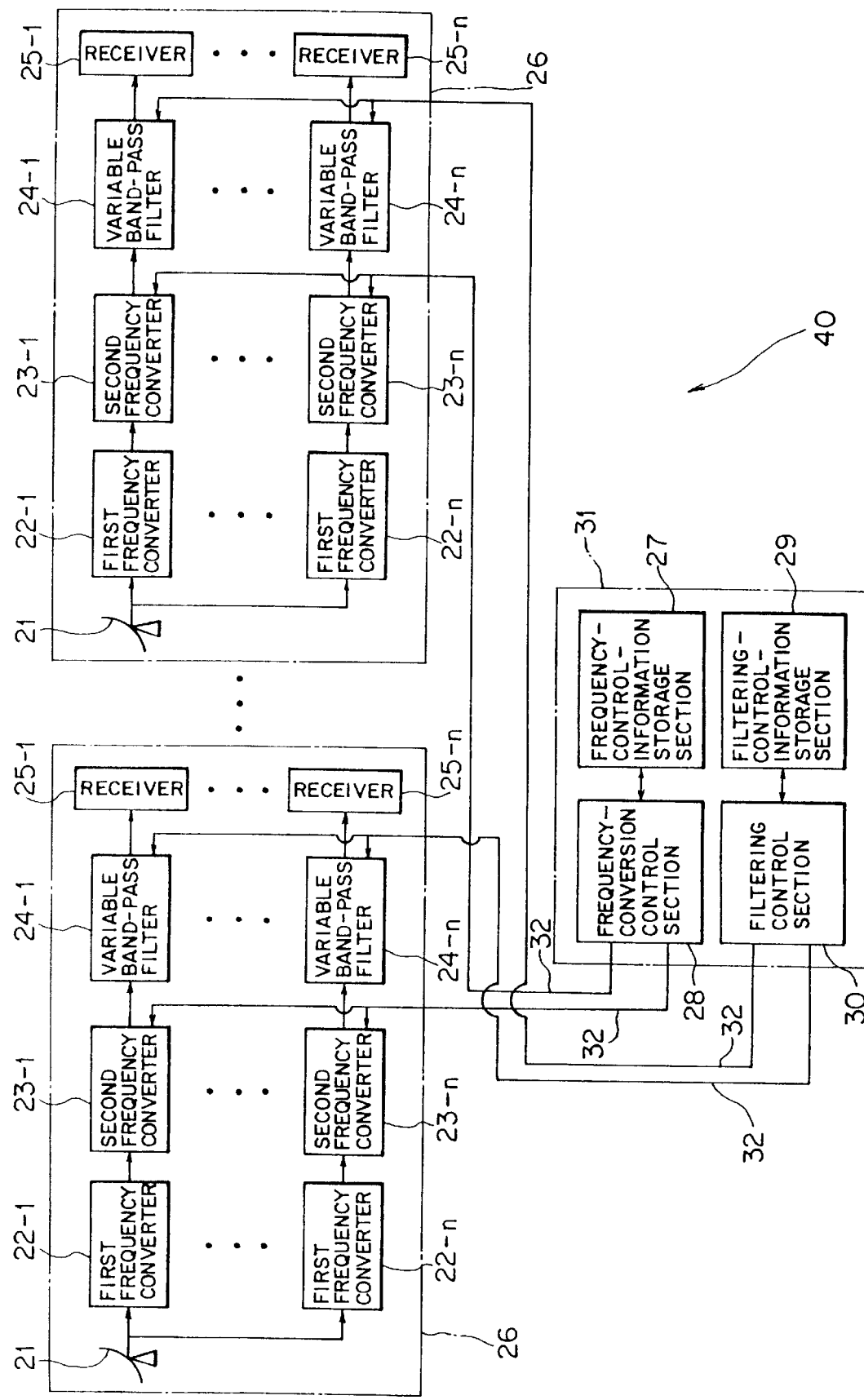
FIG. 3 is a block diagram showing an aspect of the configuration of the signal receiving system according to the present invention.

FIG. 3 is a block diagram illustrating an aspect of the signal receiving system according to the present invention. The signal receiving system 40 shown in FIG. 3 includes at least one signal receiver 26 and a receive-frequency control unit 31.

The signal receiving apparatus 26 includes a receive antenna 21 for receiving plural high-frequency signals, plural first frequency converters 22-i (i=1, . . . , n) arranged corresponding to high-frequency signals received by the receive antenna 21, each of which down-converts the frequency of each of plural high-frequency signals by a predetermined frequency, plural second frequency converters 23-i (i=1, . . . , n) for further frequency-converting the respective signals converted by means of plural first frequency converters 22-i, plural variable band-pass filters 24-i (i=1, . . . , n) for subjecting respective signals frequency-converted by means of the plural second frequency converters 23-i to a filtering process to remove undesired frequency components and to pass only a signal component of a desired frequency, and plural receivers 25-k (k=1, . . . , n) for receiving only a signal of the desired frequency among input signals passed through the variable band-pass filters 24-i.

The receive frequency control unit 31 includes a frequency control information storage section 27 connected to the signal receiving apparatuses 26 via a trunk 32, for storing frequency control information and for performing a frequency conversion by means of plural second frequency converters 23-i, a frequency conversion control section 28 for automatically controlling the frequency conversion of the plural second frequency converters 23-i based on the frequency control information stored in the frequency control information storage section 27, filtering control information storage section 29 for storing filtering control information and for performing a filtering process by plural variable band-pass filters 24-i, and filtering control section 30 for automatically controlling the filtering process by the plural variable band-pass filters 24-i based on the filtering control information stored in the filtering control information storage section 29.

Hence in the signal receiving system 40 according to the present invention, the advantage is that since a receive-frequency control unit 31 at another spot controls comprehensively the signal receiving apparatuses 26, the plural receivers 25-k in each of signal receiving apparatuses 26 can automatically receive signals without changing the setting on the side of each signal receiving apparatus 26 even if the signal to be received by each signal receiving apparatus 26 is changed according to time. In addition, there is the advantage of contributing to the cost reduction of the system construction because the dedicated receive-frequency control unit is not needed for each signal receiving apparatus 26.

(b) Explanation of the First Embodiment of the Present Invention

The first embodiment according to the present invention will be described below by referring to the attached drawings.

Figure 4:
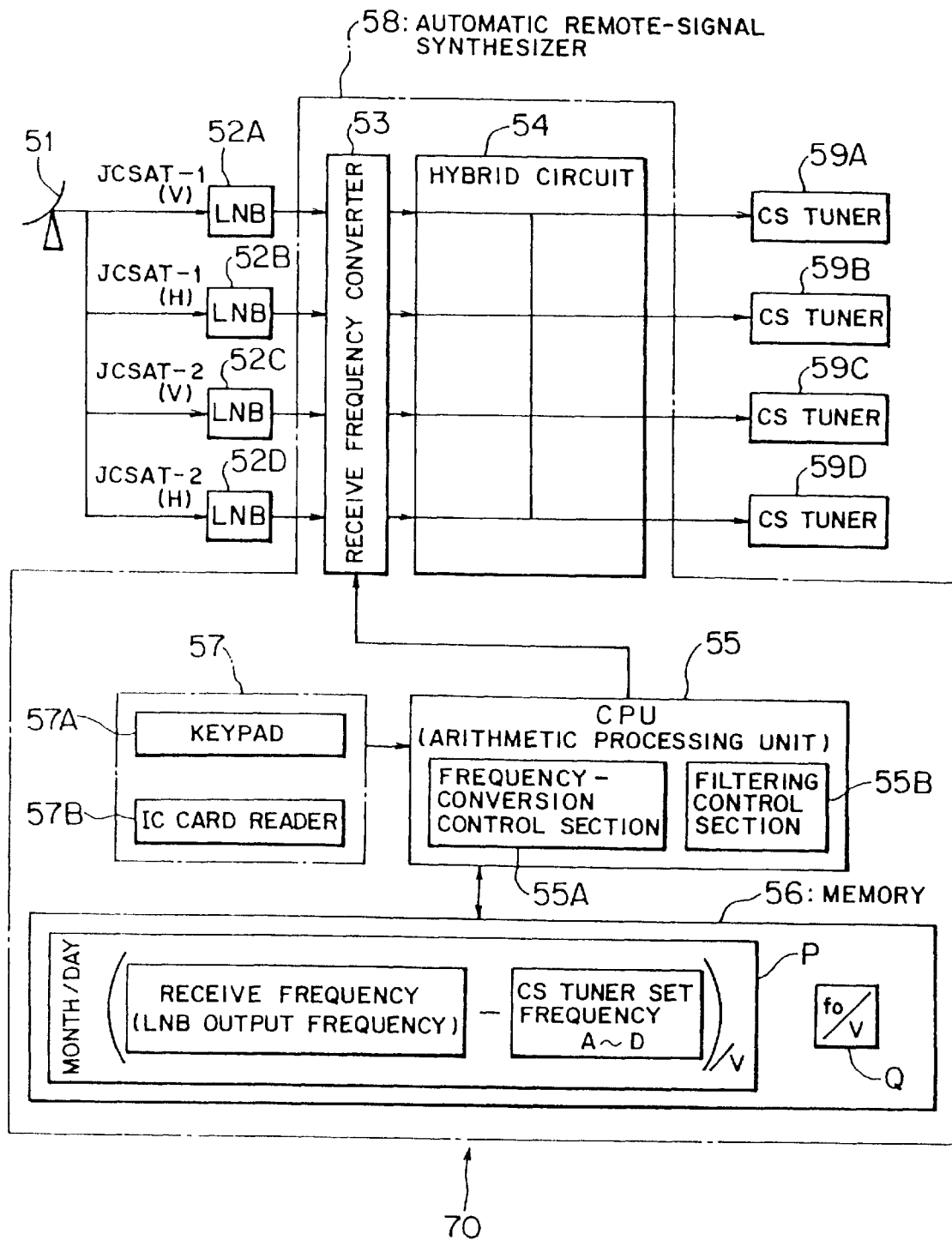
FIG. 4 is a block diagram showing a configuration of the signal receiving apparatus according to the first embodiment of the present invention.

FIG. 4 is a block diagram showing a configuration of a signal receiving apparatus according to the first embodiment of the present invention. Referring to FIG. 4, the signal receiving apparatus 70 functions as a CS receive-only station for receiving high-frequency signals from a communications satellite for CS.

The abbreviation CS represents a kind of satellite communications where signals transmitted from a signal transmitter (earth station) are received by a signal receiving apparatus (earth station) via a communications satellite (satellite station). CS means satellite broadcast communications services for businesses in which specific broadcast can be received only for a predetermined period of time after a receiver's contract.

Four satellites including JCSAT-1, JCSAT-2, Superbird A and Superbird B are well known as a CS communications satellite. Each of the communications satellites transmits two kinds of 12 GHz-band high-frequency signals including V-polarized wave signals and H-polarized wave signals. In other words, the four CS communications satellites transmit eight kinds of high-frequency signals in total.

In FIG. 4, the signal receiving apparatus 70 consists of a dual antenna 51 and low-noise frequency converters (LNB: Low Noise Block-converter) 52A to 52D installed outdoors, together with an automatic remote-signal synthesizer 58 and CS tuners 59A to 59D installed indoors.

The dual antenna 51 functions as a receive antenna of, for example, about 2.4 meters in diameter which can receive four kinds of high-frequency signals among the eight kinds of 12 GHz-band high-frequency signals.

The dual antenna 51 is arranged in a receive mode according to the position of a satellite. Either receive signals from respective satellites or V-polarized wave and H-polarized wave receive signals from one satellite are roughly divided as four output signals including noise components from the dual antenna 51.

In the present embodiment, the case where the dual antenna 51 receives as four high-frequency signals V-polarized wave high-frequency signal and H-polarized wave high-frequency signal transmitted from each of JCSAT-1 and JCSAT-2 will be typically described below.

Figure 8:
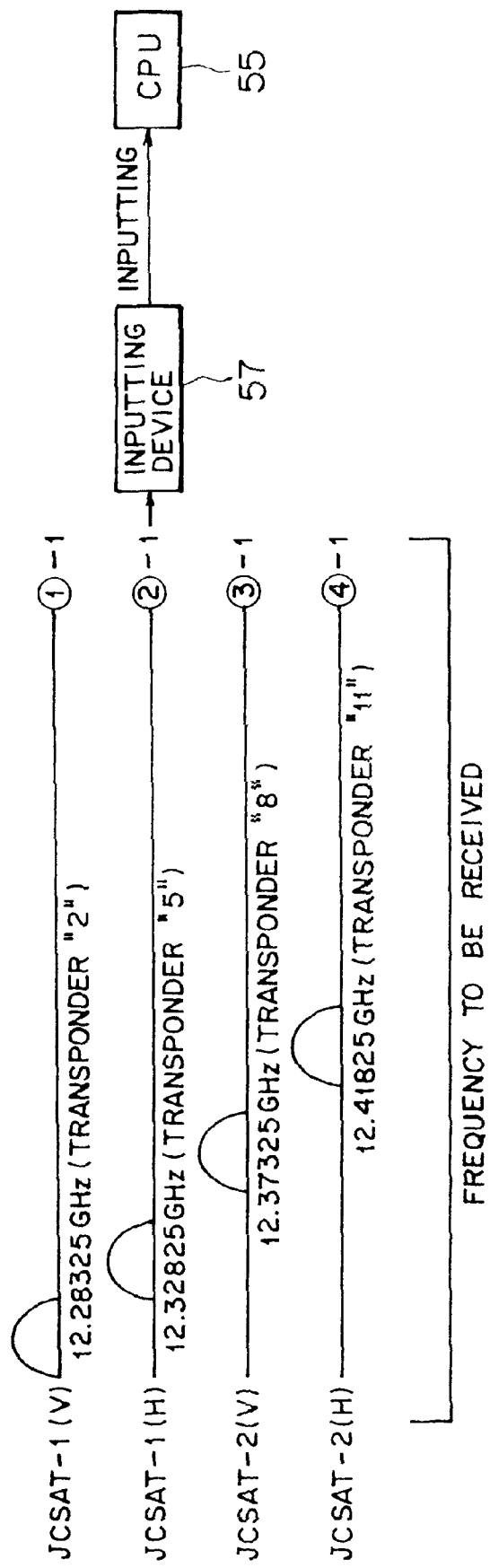
FIG. 8 is a diagram explaining an example of an operation of the automatic remote signal synthesizer in the signal receiving apparatus according to the first embodiment of the present invention.

In the present embodiment, as high-frequency signals include a V-polarized wave signal of 12.28325 GHz from the JCSAT-1 is received as a high-frequency signal (refer to ①-1 or the transponder "2" in FIG. 8), an H-polarized wave signal of 12.32825 GHz from the JCSAT-1 is received as a high-frequency signal (refer to ②-1 or the transponder "5" in FIG. 8), a V-polarized wave signal of 12.37325 GHz from the JCSAT-2 is received as a high-frequency signal (refer to ③-1 or the transponder "8" in FIG. 8), and an H-polarized wave of 12.41825 GHz from the JCSAT-2 is received as a high-frequency signal (refer to ④-1 or the transponder "11" in FIG. 8). These high-frequency signals are received by means of the dual antenna 51.

The transponder means a repeater mounted on a satellite. In the present embodiment, different transponders mounted on a communications satellite relay the signals transmitted from the signal transmitter. Then the signal receiving apparatus 70 receives the relayed signals as four high-frequency signals.

Four LNBs 52A to 52D are mounted corresponding to the 12 GHz-band high-frequency signals received by the dual antenna 51. Different frequencies high-frequency signal input to each of the LNBs 52A to 52D is changed to 1 GHz-band signal by down-converting by a fixed frequency (e.g. 11.3 GHz) so that the noise components included therein are reduced. Hence each of the LNBs 52A to 52D functions as a first frequency converter.

That is, the LNB52A receives a V-polarized wave high-frequency signal from JCSAT-1. The LNB52B receives an H-polarized wave high-frequency signal from JCSAT-1. The LNB52C receives a V-polarized wave high-frequency signal from JCSAT2. The LNB52D receives an H-polarized wave high-frequency signal from JCSAT2.

The high-frequency signals input to the LNBs 52A to 52D are down-converted by 11.3 GHz. Then the down-converted signals are input to the automatic remote signal synthesizer 58 while noise components included therein are reduced.

Figure 9:
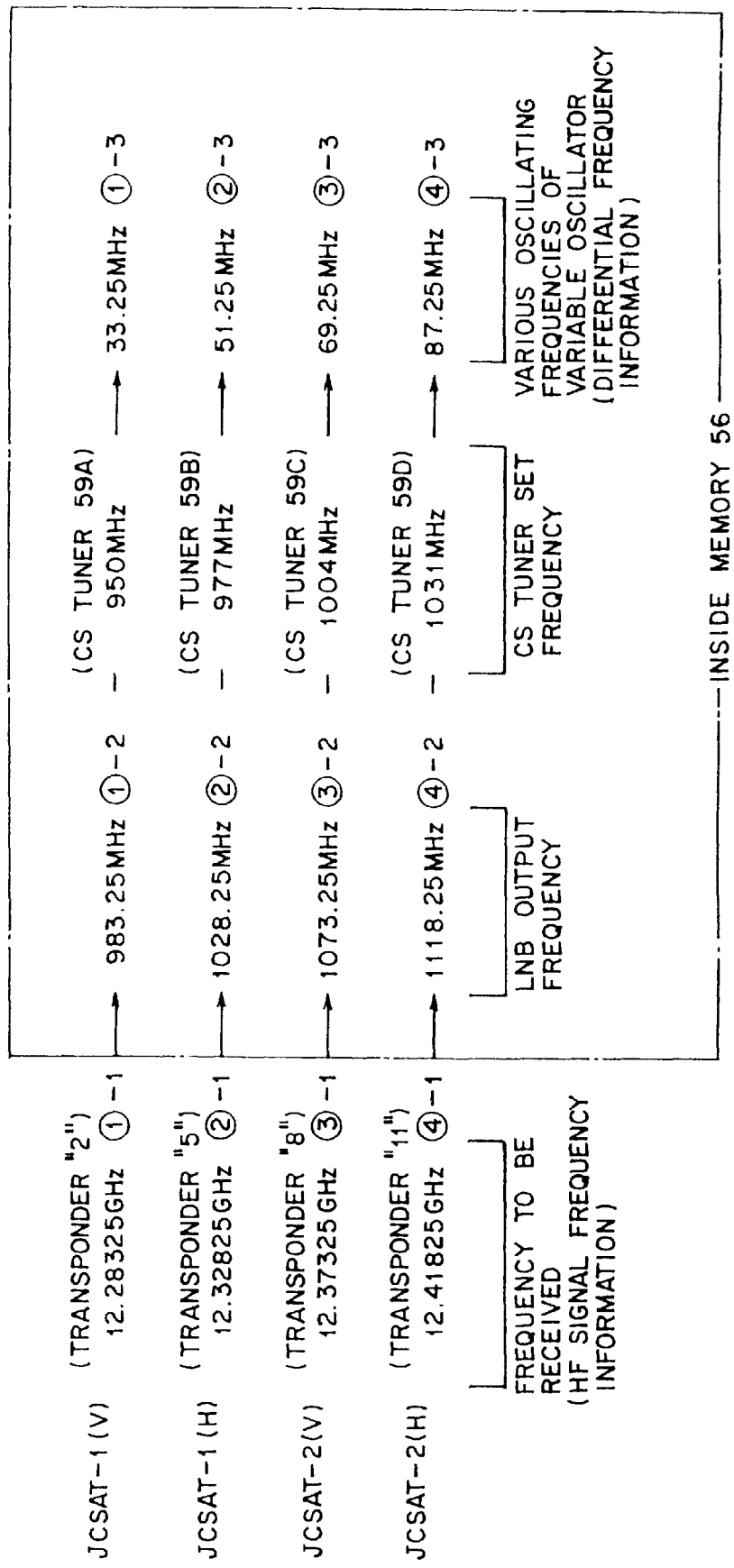
FIG. 9 is a diagram explaining an example of the operation of the automatic remote signal synthesizer in the signal receiving apparatus according to the first embodiment of the present invention.

The LNB 52A outputs a signal of 983.25 MHz (refer to ①-2 in FIG. 9). The LNB 52B outputs a signal of 1028.25 MHz (refer to ②-2 in FIG. 9 ). The LNB 52C outputs a signal of 1073.25 MHz (refer to ③-2 in FIG. 9). The LNB 52D outputs a signal of 1118.25 MHz (refer to ④-2 in FIG. 9).

The automatic remote signal synthesizer 58 also automatically frequency-converts the respective signals input from the LNBs 52A to 52D to set the frequencies of the converted signals to receive frequencies preset by the CS tuners 59A to 59D for receiving them. As shown in FIG. 4, the automatic remote signal synthesizer 58 includes a receive frequency converter 53, a hybrid circuit 54, an arithmetic processing unit (CPU) 55, a memory 56, a keypad 57A, and an IC card reader 57B, to be described later.

The CS tuners 59A to 59D are receive sections (receive tuners). In the CS tuners 59A to 59D, signals frequency-converted by the receive frequency converter 53 in the automatic remote signal synthesizer 58 are input via the hybrid circuit 54. Of the frequency-converted signals, only a signal of a frequency corresponding to a preset receive frequency is received.

Figure 5:
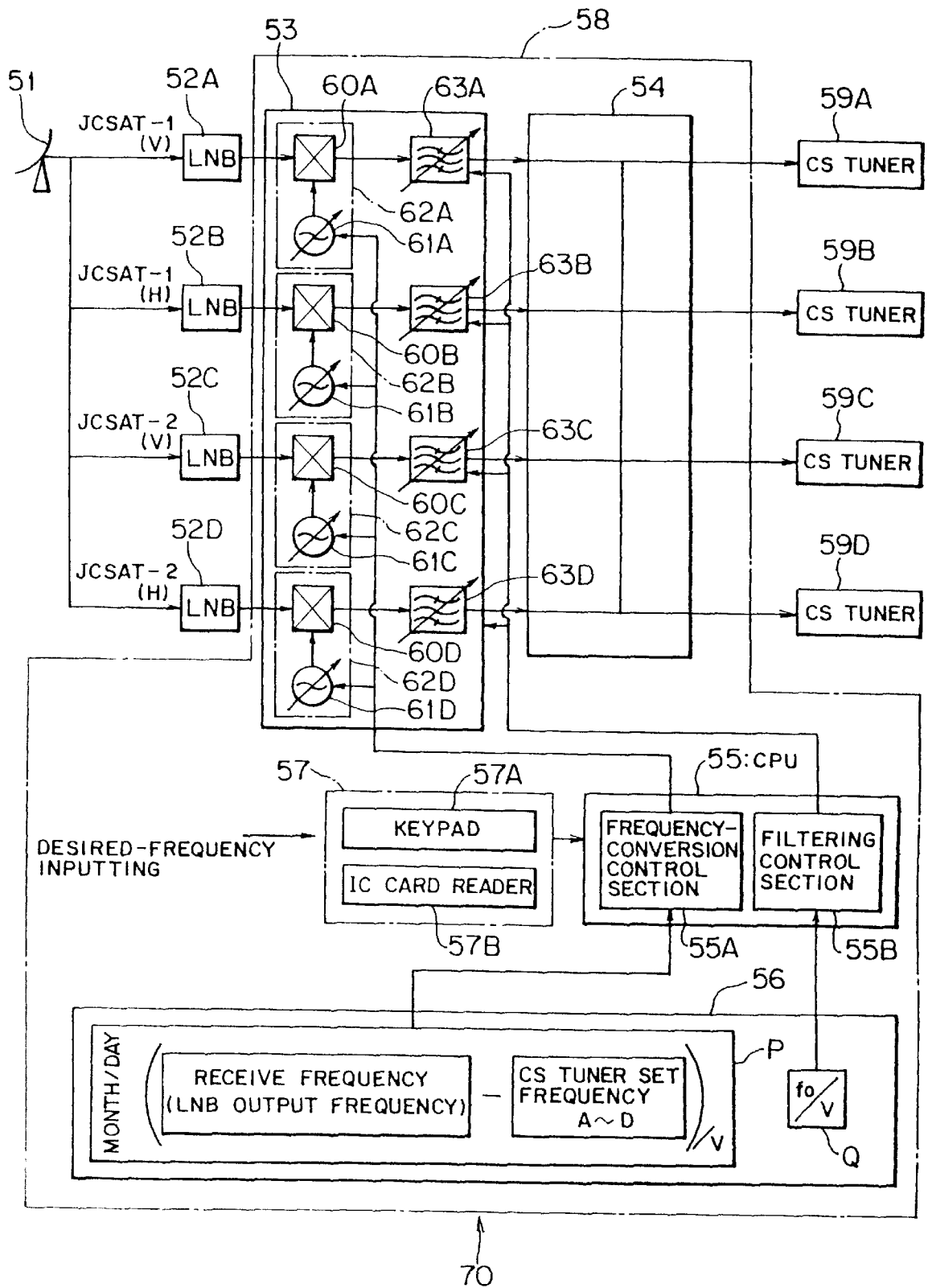
FIG. 5 is a block diagram showing a configuration of the major portion of the signal receiving apparatus according to the first embodiment of the present invention.

In the signal receiving apparatus 70 in FIGS. 4 and 5, four CS tuners 59A to 59D are mounted as receive sections each of which receives V-polarized wave and H-polarized wave high-frequency signals (four kinds of high-frequency signals) respectively transmitted from each of two communications satellites JCSAT-1 and JCSAT2.

Figure 13:
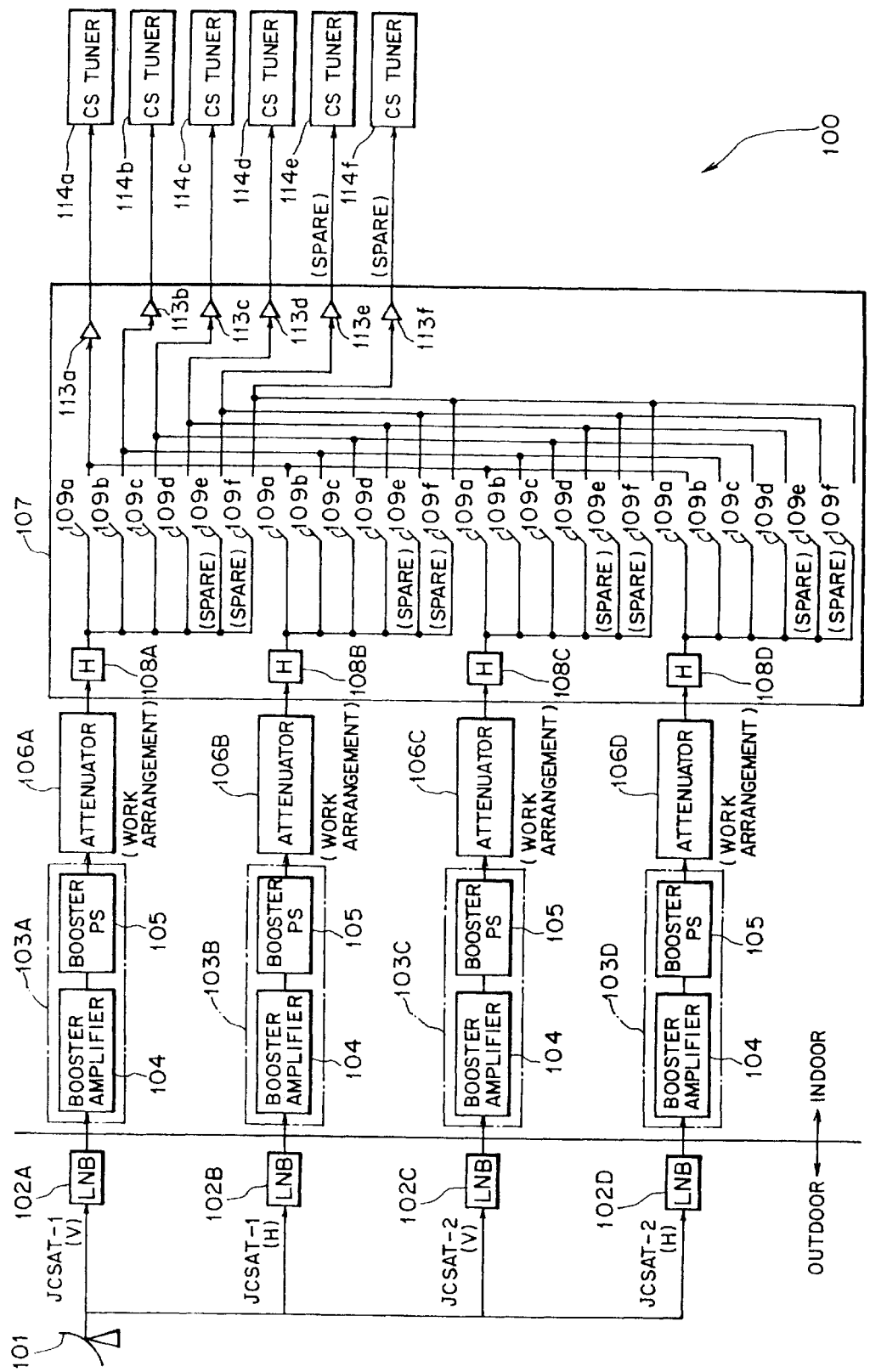
FIG. 13 is a block diagram showing the configuration of a receive-only station for communications satellites.

In the signal receiving apparatus 70 according to the present embodiment, unlike the CS tuners 114*a* to 114*d* shown in FIG. 13, since the receive frequencies of respective signals are preset, the CS tuners 59A to 59D receive signals of a frequency corresponding to a preset receive frequency among signals frequency-converted by the automatic remote signal synthesizer 58 (described above).

The receive frequency band of the CS tuners 59A to 59D ranges from 950 MHz to 1450 MHz. The receive frequency of the CS tuner 59A is set to 950 MHz. The receive frequency of the CS tuner 59B is set to 977 MHz. The receive frequency of the CS tuner 59C is set to 1004 MHz. The receive frequency of the CS tuner 59D is set to 1031 MHz.

That is, in the signal receiving apparatus 70 according to the present embodiment, the automatic remote signal synthesizer 58 controls automatically four kinds of high-frequency signals from communications satellites to be any one of the signals of 950 MHz, 977 MHz, 1004 MHz and 1031 MHz and then outputs the resultant signal. Thus even when the receive signals of the CS tuners 59A to 59D are changed due to a signal receiver's contract, signals from communications satellites can be received without changing the set frequency of each of the CS tuners 59A to 59D.

In the automatic remote signal synthesizer 58, the receive frequency converter 53 performs a frequency conversion to set a signal input from the LNB 52A to the preset receive frequency by the CS tuner 59A for receiving it, under control of the CPU 55 (as described above).

The receive frequency converter 53 includes variable signal generators 62A to 62D and variable band-pass filters (variable BPFs) 63A to 63D, to be further described in detail with FIG. 5.

The variable signal generator 62A functions as a second frequency converter for subjecting the signal converted by the LNB 52A to a further frequency conversion. The variable signal generator 62B functions as a second frequency converter for subjecting the signal converted by the LNB 52B to a further frequency conversion. The variable signal generators 62C functions as a second frequency converter for subjecting the signal converted by the LNB 52C to a further frequency conversion. The variable signal generator 62D functions as a second frequency converter for subjecting the signal converted by the LNB 52D to a further frequency conversion. The variable signal generator 62A includes a variable oscillator 61A which produces a variable frequency signal under control by the CPU 55 and a frequency converter 60A which further frequency-converts the signal down-converted by the LNB 52A by using the variable frequency signal produced by the variable oscillator 61A. The variable signal generator 62B includes a variable oscillator 61B which produces a variable frequency signal under control by the CPU 55 and a frequency converter 60B which further frequency-converts the signal down-converted by the LNB 52B by using the variable frequency signal produced by the variable oscillator 61B. The variable signal generator 62C includes a variable oscillator 61C which produces a variable frequency signal under control by the CPU 55 and a frequency converter 60C which further frequency-converts the signal down-converted by the LNB 52C by using the variable frequency signal produced by the variable oscillator 61C. The variable signal generator 62D includes a variable oscillator 61D which produces a variable frequency signal under control by the CPU 55 and a frequency converter 60D which further frequency-converts the signal down-converted by the LNB 52D by using the variable frequency signal produced by the variable oscillator 61D.

The variable BPF 63A is arranged at the front stage of the CS tuner 59A. The variable BPF 63B is arranged at the front stage of the CS tuner 59B. The variable BPF 63C is arranged at the front stage of the CS tuner 59C. The variable BPF 63D is arranged at the front stage of the CS tuner 59D. The variable BPF 63A subjects the signal frequency-converted by the variable signal generator 62A to a filtering process and then removes undesired frequency components, thus passing only desired frequency signal components. The variable BPF 63B subjects the signal frequency-converted by the variable signal generator 62B to a filtering process and then removes undesired frequency components, thus passing only desired frequency signal components. The variable BPF 63C subjects the signal frequency-converted by the variable signal generator 62C to a filtering process and then removes undesired frequency components, thus passing only desired frequency signal components. The variable BPF 63D subjects the signal frequency-converted by the variable signal generator 62D to a filtering process and then remove undesired frequency components, thus passing only desired frequency signal components.

The hybrid circuit 54 is arranged at the front stage of the CS tuners 59A to 59D to supply respective signals generated from the variable BPFs 63A to 63D to the CS tuners 59A to 59D, respectively.

The CPU 55 controls the operation of the receive frequency converter 53 by using a software process, based on information stored in the memory 56. The CPU 55 functions as a combination of a frequency-conversion control section 55A which controls the variable signal generators 62A to 62D and a filtering control section 55B which controls the variable BPFs 63A to 63D.

Further, the memory 56 functions as a frequency control information storage section which stores frequency control information for frequency-controlling by means of the variable signal generators 62A to 62D. The memory 56 also functions as a filtering control information storage section which stores filtering control information for a filtering process by means of the variable BPFs 63A to 63D.

That is, in the CPU 55, the frequency conversion control section 55A controls automatically the frequency conversions by the variable signal generators 62A to 62D based on frequency control information stored in the memory 56. The filtering control section 55B controls automatically the filtering process of the variable BPFs 63A to 63D based on frequency control information stored in the memory 56.

The frequency control information stored in the memory 56 is formed of information (high-frequency signal frequency information) regarding four kinds of high-frequency signals from two communications satellites as well as information (differential frequency information) on the difference between the frequency of a signal converted by each of the LNBs 52A to 52D and a receive frequency preset by each of the CS tuners 59A to 59D.

The high-frequency signal frequency information means frequency information regarding the four kinds of high-frequency signals transmitted from the communications satellites (V-polarized wave high-frequency signals and H-polarized wave high-frequency signals transmitted from JCSAT-1 and JCSAT-2 respectively). According to the present embodiment, four pieces of information regarding the frequencies of signals in the 12-GHz band shown with (①-1 to ④-1 in FIGS. 8 or 9 are stored as the high-frequency signal frequency information in the memory 56.

The information regarding the frequency of a signal in 1-GHz band down-converted by each of the LNBs 52A to 52D can be used as the high-frequency signal frequency information (refer to ①-1 to ④-2 shown in FIG. 9).

As shown with ①-3 in FIG. 9, differential frequency information can be obtained by calculating the difference between the output frequency ((①-2) from the LNB 52A and a receive frequency (CS tuner set frequency and channel frequency) preset by the CS tuner 59A. As shown with ②-3 in FIG. 9, differential frequency information can be obtained by calculating the difference between the output frequency (②-2) from the LNB 52B and a receive frequency (CS tuner set frequency and channel frequency) preset by the CS tuner 59B. As shown with ③-3 in FIG. 9, differential frequency information can be obtained by calculating the difference between the output frequency (③-2) from the LNB 52C and a receive frequency (CS tuner set frequency and channel frequency) preset by the CS tuner 59C. As shown with ④-3 in FIG. 9, differential frequency information can be obtained by calculating the difference between the output frequency (④-2) from the LNB 52D and a receive frequency (CS tuner set frequency and channel frequency) preset by the CS tuners 59D.

That is, each piece of differential frequency information is obtained by inversely calculating the frequency of a signal (the oscillating frequency of each of the variable oscillators 61A to 61D) to be output from each of the variable oscillators 61A to 61D. The frequency-conversion control section 55A controls automatically the variable oscillators 61A to 61D based on the differential frequency information.

In other words, in the variable signal generator 62A, the variable oscillator 61A outputs a variable frequency signal corresponding to the differential frequency information under control by the frequency conversion control section 55A. In the variable signal generator 62B, the variable oscillator 61B outputs a variable frequency signal corresponding to the differential frequency information under control by the frequency conversion control section 55A. In the variable signal generator 62C, the variable oscillator 61C outputs a variable frequency signal corresponding to the differential frequency information under control by the frequency conversion control section 55A. In the variable signal generator 62D, the variable oscillator 61D outputs a variable frequency signal corresponding to the differential frequency information under control by the frequency conversion control section 55A. The frequency converter 60A converts a signal from the LNB 52A using the variable frequency signal to set it to the set frequency of the CS tuner 59A. The frequency converter 60B converts a signal from the LNB 52B using the variable frequency signal to set it to the set frequency of the CS tuner 59B. The frequency converter 60C converts a signal from the LNB 52C using the variable frequency signal to set it to the set frequency of the CS tuner 59C. The frequency converter 60D converts a signal from the LNB 52D using the variable frequency signal to set it to the set frequency of the CS tuner 59D.

For example, the memory 56 stores differential frequency information as voltage information based on the state of a contract regarding slots for each of the variable oscillators 61A to 61D (or the receive condition of each of the CS tuners 59A to 59D contracted for each time slot). Each of the variable oscillators 61A to 61D can oscillate the frequency signal corresponding to the differential frequency information based on the voltage information input from the memory 56.

In FIGS. 4 and 5, voltage signal information corresponding to the differential frequency information and the corresponding voltage signal information are represented by P.

The filtering control section 55B controls automatically the frequency characteristics of each of the variable BPFs 63A to 63D to pass only the component of the signal of a frequency corresponding to the receive frequencies of each of the CS tuners 59A to 59D among signals output from the variable signal generators 62A to 62D, based on the filtering control information stored in the memory 56.

That is, the frequency characteristics of the variable BPFs 63A to 63D are controlled by the voltage signal from the CPU 55. The memory 56 stores as the filtering control information the receive frequencies of each of the CS tuners 59A to 59D and voltage signal information which sets each of the variable BPFs 63A to 63D to the center frequency thereof.

In FIGS. 4 and 5, the filtering control information (or receive frequencies of each of the CS tuners 59A to 59D and voltage signal information corresponding to the receive frequency) is represented by Q.

Further, the frequency control information and filtering control information can be read out of the IC card 64, for example, shown in FIG. 6 to store in the memory 56.

That is, the IC card 64 shown in FIG. 6 stores the differential frequency information and filtering control information as a signal transmission monthly schedule, and the time slot for which each of CS tuners 59A to 59D receives signals as address information.

For example, where signal transmission contents for one month which are previously scheduled for each communications satellite are recorded in the IC card reader 64, they are read out by the IC card reader 57B. The contents of the memory 56 can be updated based on the readout information.

In such a way, even when respective signals to be received by the CS tuners 59A to 59D are changed every month, the memory contents can be updated by replacing the IC card 64, with the contents of the memory 56 held in the form of an IC card. As a result, the burden on updating and registering the memory contents can be reduced.

Hence, the CPU 55 can automatically control the frequency conversion of the receive frequency converting section 53 based on the memory contents updated to transmit a desired signal to a predetermined one of the CS tuners 59A to 59D via the hybrid circuit 54.

The keypad 57A inputs newly and updates the frequency control information and filtering control information. The input frequency control information and filtering control information are set to the memory 56 via the CPU 55.

The combination of the keypad 57A and the IC card reader 57B provides an inputting device 57 which inputs setting information (frequency control information and filtering control information) to the CPU 55.

The combination of the CPU 55, the memory 56, the keypad 57A and the IC card reader 57B provides a receive-frequency control unit which controls to change the frequency of a signal received by the dual antenna 51 into a frequency receivable in each of the CS tuners 59A to 59D, under control of the receive frequency converter 53. However, the receive-frequency control unit can be connected to plural variable signal generators 53 via a trunk to remote-control them.

In the signal receiving apparatus 70 with the above-mentioned configuration according to the first embodiment of the present invention, when each of the communications satellites JCSAT-1 and JCSAT-2 transmits V-polarized wave high-frequency signals and H-polarized wave high-frequency signals, the dual antenna 51 receives four kinds of high-frequency signals transmitted, as shown in FIGS. 4 and 5.

The four kinds of high-frequency signals received are down-converted to 1-GHz band signals by means of the LNBs 52A to 52D, respectively. Then, the automatic remote signal synthesizer 58 subjects the down-converted signals to a desired frequency conversion process. The resultant frequency-converted signals are received by means of the corresponding CS tuners 59A to 59D, respectively.

The operation of the automatic remote signal synthesizer 58 will be described using FIGS. 7 to 10.

Figure 7:
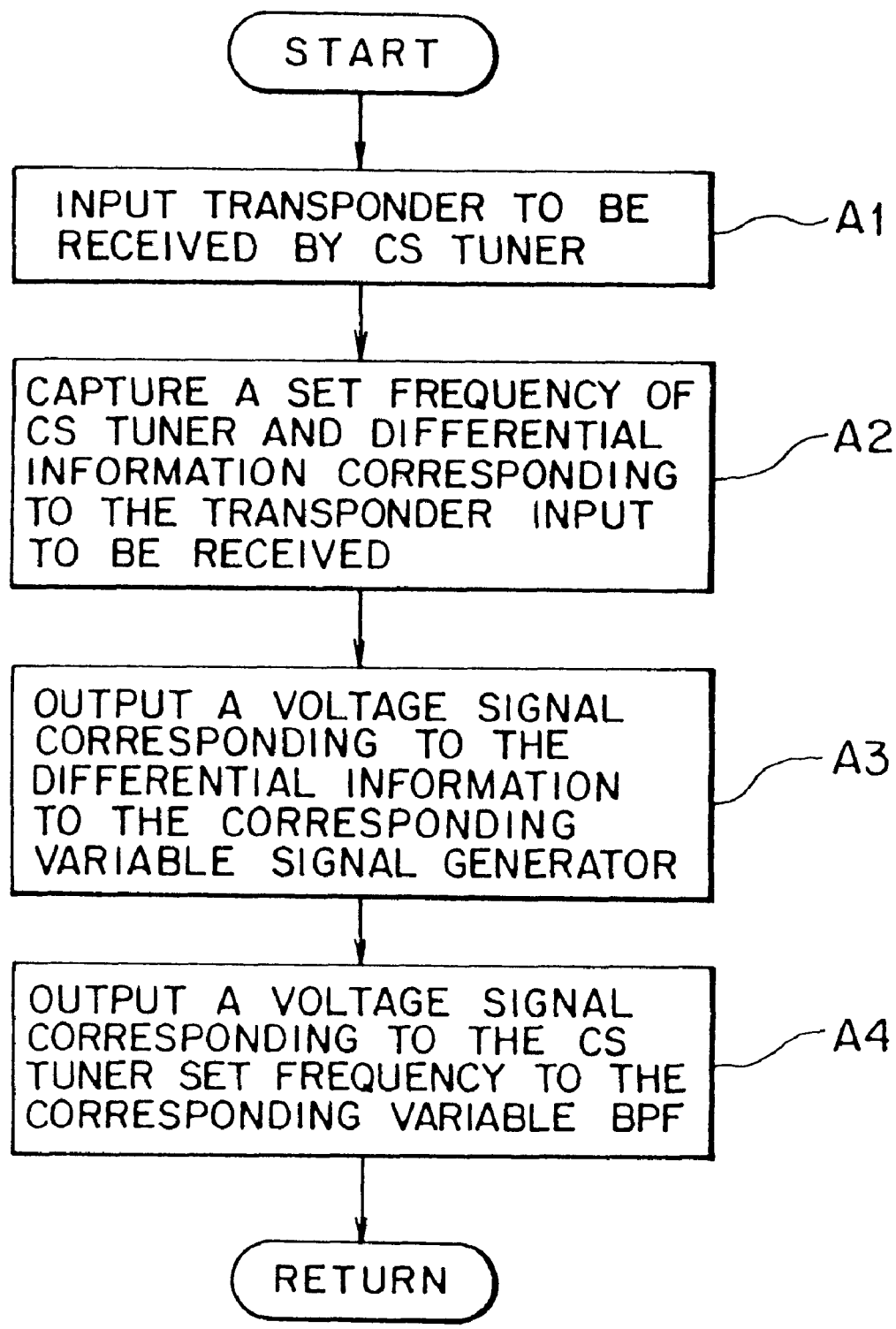
FIG. 7 is a flowchart showing an example of the operation of the automatic remote signal synthesizer in the signal receiving apparatus according to the first embodiment of the present invention.
Figure 10:
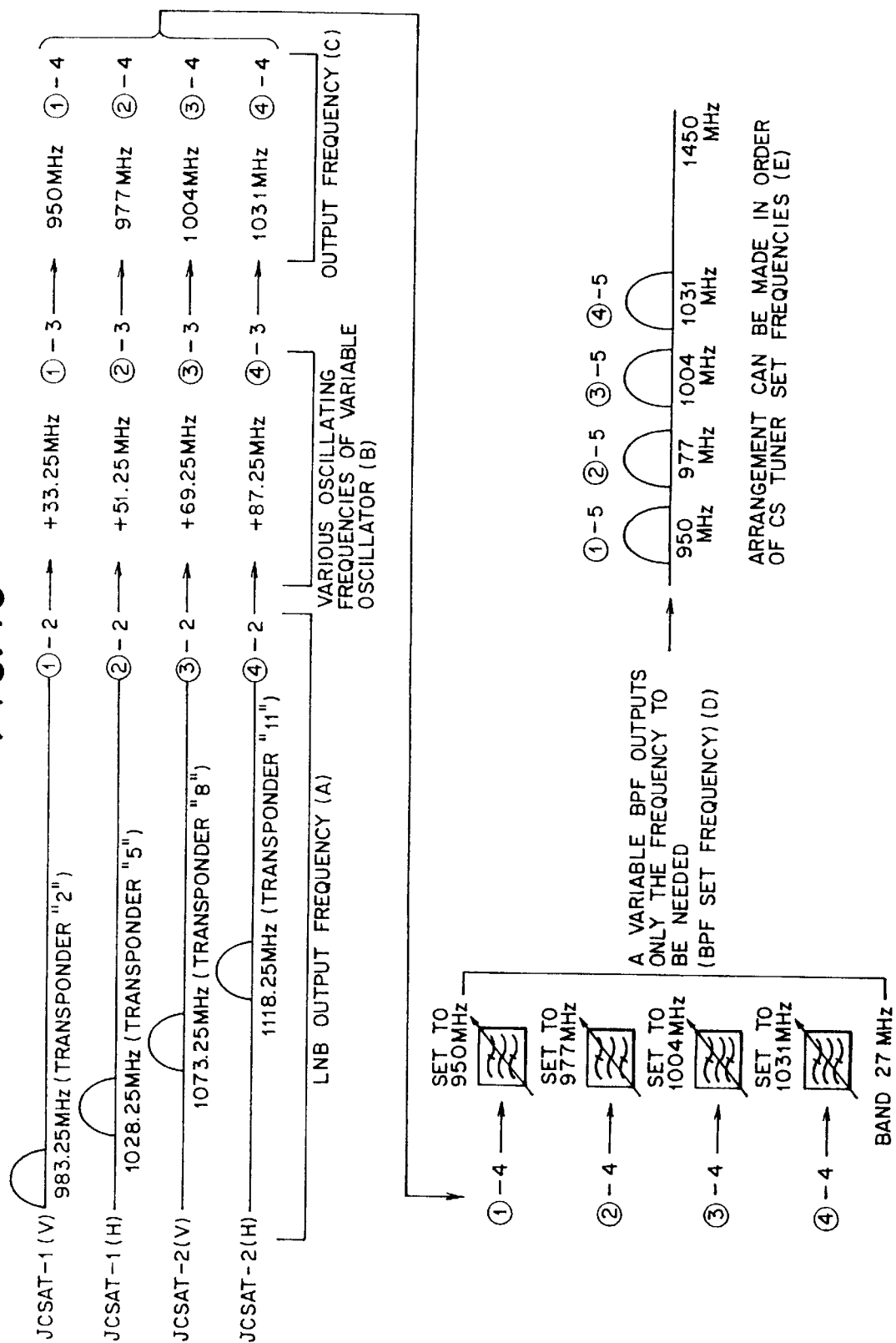
FIG. 10 is a diagram explaining an example of the operation of the automatic remote signal synthesizer in the signal receiving apparatus according to the first embodiment of the present invention.

FIG. 7 is a flowchart showing an example of the operation of the automatic remote signal synthesizer 58 according to the present embodiment. FIGS. 8 to 10 are diagrams each showing an example of the operation of the automatic remote signal synthesizer 58 according to the present embodiment.

In the automatic remote signal synthesizer 58 according to the present embodiment, as shown in FIG. 8, the CPU 55 recognizes the receive frequency (transponder) to be received by each of the CS tuners 59A to 59D which are input from the keypad 57A or the IC card reader 57B (step A1 in FIG. 7).

Hereinafter, the case where the CS tuners 59A to 59D receive the following signals respectively will be described below. The frequency of a V-polarized wave signal transmitted from JCSAT-1 is 12.28325 GHz (refer to the transponder "2"). The frequency of an H-polarized wave signal transmitted from JCSAT-1 is 12.32825 GHz (refer to the transponder "5"). The frequency of a V-polarized wave signal transmitted from JCSAT-2 is 12.37325 GHz (refer to the transponder "8"). The frequency of an H-polarized wave signal transmitted from JCSAT-2 is 12.41825 GHz (refer to the transponder "11").

In this case, the variable signal generator 53 in the automatic remote signal synthesizer 58 receives a signal of 983.25 MHz from the LNB 52A, a signal of 1028.25 MHz from the LNB 52B, a signal of 1073.25 MHz from the LNB 53c, and a signal of 1118.25 MHz from the LNB 52D (each including other frequency components as noises) (refer to (A) in FIG. 10).

Successively, the CPU 55 captures set frequencies of each of the CS tuners 59A to 59D and differential frequency information (refer to FIG. 9) corresponding to the receive frequency input at the step A1 shown in FIG. 7 by retrieving the memory 56 (step A2 in FIG. 7).

The CPU 55 determines frequency control information (voltage information) for controlling the variable oscillators 61A to 61D based on the differential frequency information captured. That is, the CPU 55 outputs a voltage signal corresponding to the respective differential frequency information to the variable oscillators 61A to 61D. Each of the variable oscillators 61A to 61D outputs a frequency signal based on the control information (step A3 in FIG. 7).

In this case, the variable oscillator 61A generates a signal of 33.25 MHz (refer to ①-3 in FIG. 9) corresponding to the control voltage signal from the CPU 55 (refer to (B) in FIG. 10). The variable oscillator 61B generates a signal of 51.25 MHz (refer to ②-3 in FIG. 9) corresponding to the control voltage signal from the CPU 55 (refer to (B) in FIG. 10). The variable oscillator 61C generates a signal of 69.25 MHz (refer to ③-3 in FIG. 9) corresponding to the control voltage signal from the CPU 55 (refer to (B) in FIG. 10). The variable oscillator 61D generates a signal of 87.25 MHz (refer to ④-3 in FIG. 9) corresponding to the control voltage signal from the CPU 55 (refer to ④-3 in FIG. 9) (refer to (B) in FIG. 10).

The variable signal generator 62A frequency-converts a signal of 983.25 MHz (refer to ①-2 in FIG. 10) from the LNB52A into a signal of 950 MHz (①-4 in FIG. 10; including other frequency components as noises) by using a signal of 33.25 MHz (refer to (1)-3 in FIG. 10) from the variable oscillator 61A (refer to (C) in FIG. 10). The variable signal generator 62B converts a signal of 1028.25 MHz (refer to ②-2 in FIG. 10) from the LNB52B into a signal of 977 MHz ((②-4 in FIG. 10; including other frequency component as noises) by using a signal of 51.25 MHz (refer to ②-3 in FIG. 10) from the variable oscillator 61B (refer to (C) in FIG. 10). The variable signal generator 62C converts a signal of 1073.25 MHz (refer to ③-2 in FIG. 10) from the LNB52C into a signal of 1004 MHz ((③-4 in FIG. 10; including other frequency component as noises) by using a signal of 69.25 MHz (refer to ③-3 in FIG. 10) from the variable oscillator 61C (refer to (C) in FIG. 10). The variable signal generator 62D converts a signal of 1118.25 MHz (refer to ④-2 in FIG. 10) from the LNB52D into a signal of 1031 MHz ((④-4 in FIG. 10; including other frequency component as noises) by using a signal of 87.25 MHz (refer to ④-3 in FIG. 10) from the variable oscillator 61D (refer to (C) in FIG. 10).

Further, the CPU 55 outputs the control voltage signal according to the set frequency of the captured one of the CS tuner 59A to the corresponding variable BPF 63A (step A4 in FIG. 7). The CPU 55 outputs the control voltage signal according to the set frequency of the captured one of the CS tuner 59B to the corresponding variable BPF 63B (step A4 in FIG. 7). The CPU 55 outputs the control voltage signal according to the set frequency of the captured one of the CS tuner 59C to the corresponding variable BPF 63C (step A4 in FIG. 7). The CPU 55 outputs the control voltage signal according to the set frequency of the captured one of the CS tuner 59D to the corresponding variable BPF 63D (step A4 in FIG. 7).

That is, The CPU 55 outputs respective control voltage signals to the variable BPFs 63A to 63D. Thus the center frequency of a pass characteristic of the variable BPF 63A is set to 950 MHz. The center frequency of a pass characteristic of the variable BPF 63B is set to 977 MHz. The center frequency of a pass characteristic of the variable BPF 63C is set to 1004 MHz. The center frequency of a pass characteristic of the variable BPF 63D is set to 1031 MHz.

The variable BPF 63A removes an undesired frequency components in the signal from the variable signal generator 62A (refer to (D) in FIG. 10). The variable BPF 63B removes an undesired frequency components in the signal from the variable signal generator 62B (refer to (D) in FIG. 10). The variable BPF 63C removes an undesired frequency components in the signal from the variable signal generator 62C (refer to (D) in FIG. 10). The variable BPF 63D removes an undesired frequency components in the signal from the variable signal generator 62D (refer to (D) in FIG. 10). The CS tuner 59A receives a signal of 950 MHz via the hybrid circuit 54 ((①)-5 in FIG. 10). The CS tuner 59B receives a signal of 977 MHz via the hybrid circuit 54 ((②)-5 in FIG. 10). The CS tuner 59C receives a signal of 1004 MHz via the hybrid circuit 54 ((③)-5 in FIG. 10). The CS tuner 59D receives a signal of 1031 MHz via the hybrid circuit 54 ((④)-5 in FIG. 10).

The signal from the LNB 52A is shifted by the oscillating frequency of the variable oscillator 61A. The signal from the LNB 52B is shifted by the oscillating frequency of the variable oscillator 61B. The signal from the LNB 52C is shifted by the oscillating frequency of the variable oscillator 61C. The signal from the LNB 52D is shifted by the oscillating frequency of the variable oscillator 61D. Thus, in the band ranging from the 950 MHz to 1450 MHz, the receive frequency band of the CS tuners 59A to 59D can be arranged without mixing any one of them (refer to (E) in FIG. 10).

Each of the CS tuners 59A to 59D can selectively receive an arbitrary signal among the signals by varying the setting of the variable oscillators 61A to 61D and the setting of the variable BPFs 63A to 63D under control of the CPU 55.

For example, when the CS tuner 59B installed at another spot, instead of the CS tuner 59A, receives the V-polarized wave signal from JCSAT-1 for the slot of validity of a receiver's contract, it is sufficient that the automatic remote signal synthesizer 58 simply converts the signal from the LNB 52A into a signal of 977 MHz being the set frequency of the CS tuner 59B. The converted signal of 977 MHz is received by the CS tuner 59B via the hybrid circuit 54.

When the slot defined by the receiver's contract ends, the CS tuners 59A to 59D cannot receive the V-polarized wave signal from JCSAT-1.

When the following time is contracted for the reception of other signals (transponders), the CPU 55 changes automatically the setting of the variable oscillators 61A to 61D and the setting of the variable BPFs 63A to 63D, so that the signals from a desired satellite can be received.

In the case where it is desired that the CS tuner 59A receives the V-polarized wave signal of 12.28325 GHz from JCSAT-1 while the CS tuner 59B receives the V-polarized wave signal of 12.28325 GHz from another satellite, the CPU 55 controls automatically the variable oscillators 61A to 61D and the variable BPFs 63A to 63D based on the differential frequency information corresponding to the receive frequency information of each of the CS tuners 59A and 59B. Then it is sufficient that the frequency of the V-polarized wave signal from JCSAT-1 is converted into the frequency of the CS tuner 59A while the frequency of the V-polarized wave signal from the other satellite is converted into the frequency of the CS tuner 59B.

As described above, in the signal receiving apparatus 70 according to the first embodiment of the present invention, the automatic remote signal synthesizer 58 monitors frequencies of respective signals input from the LNBs 52A to 52D to automatically convert them into the receive frequencies preset by the CS tuners 59A to 59D. When the CS tuners 59A to 59D receive different signals in communications time slot, or two different communications satellites use respective signals of the same frequency (transponders), four kinds of signals from the communications satellites can be received under remote control from the CPU 55, without frequently changing the setting of the receive on the side of the CS tuners 59A to 59D.

Both signal switching control by the variable switching box 107 and setting of the receive frequencies of each of the CS tuners 114a to 114f, in the receiver-only station 100 shown in FIG. 13, are not needed. Hence, the advantage is that troubles in setting and controlling of signal reception can be remarkably reduced.

Further, since it is not needed to arrange the variable switching box 107 and the amplifiers 103A to 103D in the receive-only station 100 shown in FIG. 13, miniaturization of devices and cost reduction can be realized.

Since the contents of the memory 56 is converted in a form of an IC card, the memory contents can be updated only by replacing the IC card 64 with a new one even if the signals to be received by the CS tuners 59A to 59D are changed every month. Particularly, the advantage is that the receive frequency converting section 53 can automatically control its frequency conversion based on various conditions of a receiver's contract including contract conditions according to months, seasons, or the like.

Furthermore, arranging the hybrid circuit 54 offers the advantage that each of the CS tuners 59A to 59D can selectively receive a desired signal among four signals from the communications satellites.

The same advantage is provided in the case of no arrangement of the hybrid circuit 54 because the receive frequency converter 53 can at least convert four signals from LNBs 52A to 52D into signals of four kinds of frequencies for the CS tuners 59A to 59D.

(c) Explanation of the Second Embodiment of the Present Invention

Figure 11:
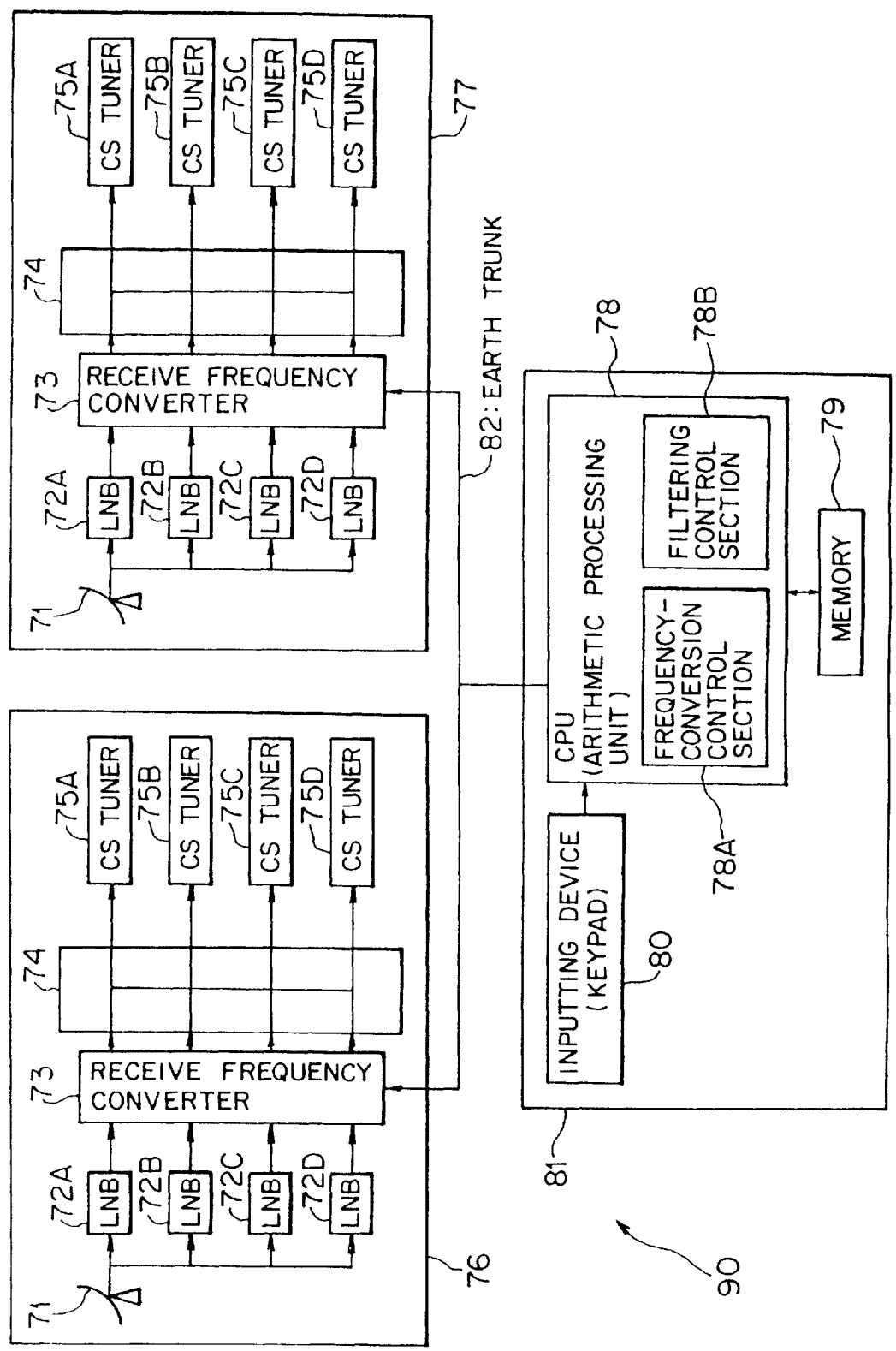
FIG. 11 is a block diagram showing a configuration of a signal receiving system according to the second embodiment of the present invention.

FIG. 11 is a block diagram illustrating the configuration of a signal receiving system according to the second embodiment of the present invention. Referring to FIG. 11, signal receiving system 90 controls remotely the receiving aspect of each of A station 76 and the B station 77 acting as a CS signal receiving station (receive-only station) which receives high-frequency signals from communications satellites for CS, by monitoring it by means of a receive-frequency control unit 81 connected to an earth trunk 82.

That is, the receive signal switching operation in each signal receiving station can be omitted by comprehensively controlling the receiving aspects of two signal receiving stations by means of the receive-frequency control unit 81 at another spot.

As shown in FIG. 11, the A station 76 or B station 77 acts as a signal receiving apparatus. Each of the A station 76 and B station 77 includes a dual antenna 71, low-noise frequency converters (LNBs; Low Noise Block-converters) 72A to 72D, a receive frequency converter 73, a hybrid circuit 74, and CS tuners 75A to 75D.

The dual antenna 71 is identical to the dual antenna 51 shown in FIGS. 4 and 5 in configuration and function. The LNBs 72A to 72D are identical to the LNBs 52A to 52D shown in FIGS. 4 and 5 in configuration and function. The receive frequency converter 73 is identical to the receive frequency converter 53 shown in FIGS. 4 and 5 in configuration and function. The hybrid circuit 74 is identical to the hybrid circuit 54 shown in FIGS. 4 and 5 in configuration and function. The CS tuners 75A to 75D are identical to the CS tuners 59A to 59D shown in FIGS. 4 and 5 in configuration and function. Hence, the detail explanation will be omitted here.

The receive-frequency control unit 81 is connected to the signal station (the A station 76 or B station 77) via the earth trunk 82. The receive-frequency control unit 81 includes a CPU (arithmetic processing unit) 78, a memory 79, and an inputting device (keypad) 80.

The CPU 78 controls an operation of the receive frequency converter 73 according to a software process, based on an information stored in the memory 79. The CPU 78 has functions corresponding to the frequency-conversion control section 78A which controls the function section (refer to numerals 62A to 62D in FIG. 5) acting as a variable signal generator to the receive frequency converter 73, and a filtering control section 78B which controls the function section (refer to numerals 63A to 63D in FIG. 5) acting as a variable band-pass filter (variable BPF) to the receive frequency converter 73.

In the CPU 78, the frequency-conversion control section 78A is identical to that shown in FIGS. 4 and 5 (refer to numeral 55A). The filtering control section 78B is identical to that shown in FIGS. 4 and 5 (refer to numeral 55B). Hence, the detail explanation will be omitted here.

The memory 79 has a function as a frequency control information storage section which stores frequency control information for performing a frequency converting operation by means of the variable signal generator and a function as a filtering control information storage section for performing a filtering operation by means of the variable BPF.

The memory 79 stores frequency control information for the signal receiving stations 76 and frequency control information for the signal receiving stations 77, identical to those (refer to numeral 56) seen in FIGS. 4 and 5. That is, the memory 79 stores voltage signal information corresponding to the differential frequency information for making the variable oscillator in the receive frequency converter 73 oscillate variable frequency signals, as frequency control information based on the receive schedule in the CS tuners 75A to 75D in each of the signal receiving stations 76 and 77. The memory 79 also stores another voltage signal information as filtering control information for setting the center frequency of the filter pass characteristic of the variable BPF in the receive frequency converter 73 to the receive frequency of each of the CS tuners 75A to 75D.

Figure 12:
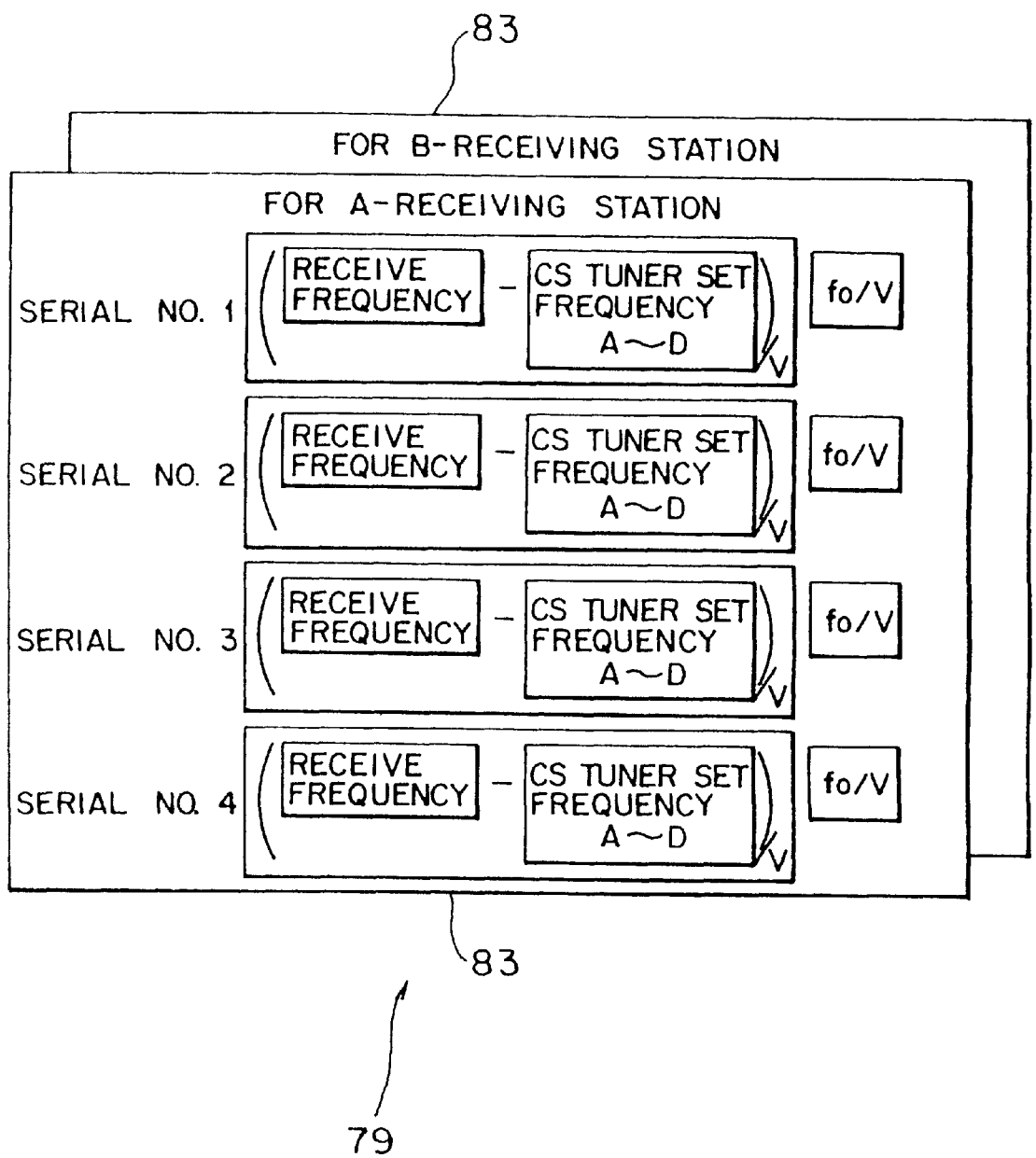
FIG. 12 is a diagram showing an example of a table used in the signal receiving system according to the second embodiment of the present invention.

In concrete, the memory 79 stores the frequency control information and the filtering control information in the format of the table 83 for each of the signal receiving stations 76 and 77, for example, as shown in FIG. 12.

In the table 83 shown in FIG. 12, serial numbers are attached for each setting operation, based on the receive schedule of each of the signal receiving stations 76 and 77.

In other words, the serial numbers are set for setting where each of the CS tuners 75A to 75D receives different signals by time because of the signal receiver's contract for each of the CS tuners 75A to 75D.

The receive frequency information of the CS tuner 75A set by time to which the serial number 1 is attached, the receive frequency information of the CS tuner 75B set by time to which the serial number 2 is attached, the receive frequency information of the CS tuner 75C set by time to which the serial number 3 is attached and the receive frequency information of the CS tuner 75D set by time to which the serial number 4 is attached are stored in the table 83 shown in FIG. 12.

Further, the keypad 80 sets the frequency control information and the filtering control information to the memory 79 via the CPU 78 by newly inputting and updating them.

In the signal receiving system 90 with the above-mentioned configuration according to the second embodiment of the present invention, when each of the communications satellites JCSAT-1 and JCSAT-2 transmits V-polarized wave high-frequency signals and H-polarized wave high-frequency signals, the dual antenna 71 at each of the A station 76 and B station 77 receives four kinds of high-frequency signals transmitted, as shown in FIG. 11.

After the four kinds of received high-frequency signals are respectively down-converted by the LNBs 72A to 72D to 1-GHz-band signals, the receive frequency converter 73 subjects the down-converted signals to a desired frequency conversion process. Then the resultant signals are received by the corresponding CS tuners 59A to 59D, respectively.

The receive frequency converter 73 arranged in each of the A station 76 and the B station 77 is comprehensively controlled by means of the CPU 78 in the receive-frequency control unit 81 arranged remotely.

That is, like the first embodiment, in the receive frequency converters 73 at each of the A station 76 and the B station 77, the frequency conversion control section 78A in the CPU 78 controls comprehensively the function section acting as a variable signal generator, based on the receive schedule of each of the A station 76 and the B station 77 stored into the table 83 in the memory 79, while the filtering control section 78B in the CPU 78 controls comprehensively the other function section acting as a variable BPF.

As described above, since a receive-frequency control unit 81 at another spot controls comprehensively the receive frequency converters 73 in each of signal receiving stations (the A station 76 and B station 77), the signal receiving system 90 according to the second embodiment of the present invention provides the same advantage as that in the first embodiment. Moreover, there is an advantage in that even if signals to be received by each signal receiving station is changed with time, each signal receiving station can receive automatically it without changing the setting thereat.

The second embodiment provides an advantage that no need of arrangement of a dedicated receive-frequency control unit for each signal receiving station can contribute to the cost reduction of system configuration.

Furthermore, the same advantage as that above-described can be provided even if the hybrid circuit 74 is not arranged, since the receive frequency converter 73 can at least convert four kinds of signals from LNBs 72A to 72D into signals of four frequencies for the CS tuners 75A to 75D, respectively.

What is claimed is:

1. A signal receiving apparatus comprising:
   a receiver antenna for receiving a plurality of high-frequency signals;
   a plurality of first frequency converters each for converting the frequency of a corresponding one of said high-frequency signals into a predetermined lower frequency;
   a plurality of second frequency converters each for further converting said predetermined lower frequency of said corresponding signal, which is converted by the corresponding first frequency converter;
   a frequency control information storage section for storing frequency control information, which is to be used for the frequency conversion by said second frequency converters;

a frequency-conversion control section for automatically controlling the frequency conversion by said second frequency converters based on said frequency control information stored in said frequency control information storage section; and at least one receiver for receiving only a signal of a desired frequency among the signals whose frequencies are converted by said second frequency converters;

each said second frequency converter including a variable oscillator for generating a variable frequency signal under control by said frequency-conversion control section, and a frequency converter for further converting said resultant signal, which is the output of said first frequency converter, using said variable frequency signal generated by said variable oscillator.

2. The signal receiving apparatus according to claim 1, further comprising:

plural variable band-pass filters respectively arranged in the front stage of said receiver, for subjecting respective signals frequency-converted by means of said plural second frequency converters to a filtering process to remove undesired frequency components and to pass only signal components of said desired frequency;

a filtering control information storage section for storing filtering control information for executing a filtering process by means of said plural variable band-pass filters; and a filtering control section for automatically controlling the filtering process by said plural variable band-pass filters based on the filtering control information stored in said filtering control information storage section.

3. The signal receiving apparatus according to claim 2, further comprising:

an inputting section for setting frequency control information which automatically controls said plural second frequency converters to said frequency control information storage section and for setting filtering control information which automatically controls said variable band-pass filters to said filtering control information storage section.

4. A signal receiving apparatus comprising:

a receiver antenna for receiving a plurality of high-frequency signals;

a plurality of first frequency converters each for converting the frequency of a corresponding one of said high-frequency signals into a predetermined lower frequency;

a plurality of second frequency converters each for further converting said predetermined lower frequency of said corresponding signal, which is converted by the corresponding first frequency converters;

a frequency control information storage section for storing frequency control information, which is to be used for the frequency conversion by said second frequency converters;

a frequency-conversion control section for automatically controlling the frequency conversion by said second frequency converters based on said frequency control information stored in said frequency control information storage section;

at least one receiver for receiving only a signal of a desired frequency among the signals whose frequencies are converted by said second frequency converters;

a plurality of variable band-pass filters respectively arranged in the front stage of said receiver, for subjecting the signal, which is converted by said corresponding second frequency converter, to a filtering process to remove undesired frequency components and to pass only signal components of said desired frequency;

a filtering control information storage section for storing filtering control information, which is to be used for the filtering process by said variable band-pass filters; a filtering control section for automatically controlling the filtering process by said variable band-pass filters based on the filtering control information stored in said filtering control information storage section; and a hybrid circuit arranged in the front stage of said receivers, for supplying the signals produced from said variable band-pass filters to said receivers.

5. A signal receiving apparatus comprising:

a receiver antenna for receiving a plurality of high-frequency signals;

a plurality of first frequency converters each for converting the frequency of a corresponding one of said high-frequency signals into a predetermined lower frequency;

a plurality of second frequency converters each for further converting said predetermined lower frequency of said corresponding signal, which is converted by the corresponding first frequency converter;

a frequency control information storage section for storing frequency control information, which is to be used for the frequency conversion by said second frequency converters;

a frequency-conversion control section for automatically controlling the frequency conversion by said second frequency converters based on said frequency control information stored in said frequency control information storage section; and at least one receiver for receiving only a signal of a desired frequency among the signals whose frequencies are converted by said second frequency converters;

said frequency control information being formed of information regarding said high-frequency signals and information regarding a differential between the frequency of the signal converted by said first frequency converter and the frequency of the signal received by said receiver.

6. The signal receiving apparatus according to claim 5 wherein said frequency control information storage section stores the frequency control information based on a signal receive schedule for receiving signal for each of said receivers.

7. A signal receiving apparatus comprising:

a receiver antenna for receiving a plurality of high-frequency signals;

a plurality of first frequency converters each for converting the frequency of a corresponding one of said high-frequency signals into a predetermined lower frequency;

a plurality of second frequency converters each for further converting said predetermined lower frequency of said corresponding signal, which is converted by the corresponding first frequency converter;

a frequency control information storage section for storing frequency control information, which is to be used for the frequency conversion by said second frequency converters;

a frequency-conversion control section for automatically controlling the frequency conversion by said second frequency converters based on said frequency control information stored in said frequency control information storage section;

at least one receiver for receiving only a signal of a desired frequency among the signals whose frequencies are converted by said second frequency converters;

a plurality of variable band-pass filters respectively arranged in the front stage of said receiver, for subjecting the signal, which is converted by said corresponding second frequency converter, to a filtering process to remove undesired frequency components and to pass only signal components of said desired frequency;

a filtering control information storage section for storing filtering control information, which is to be used for the filtering process by said variable band-pass filters;

a filtering control section for automatically controlling the filtering process by said variable band-pass filters based on the filtering control information stored in said filtering control information storage section;

said frequency control information storage section storing the filtering control information based on a signal receive schedule for receiving signal for each of said receivers.

8. The signal receiving apparatus according to claim 2, wherein said frequency-conversion control section is connected to said plural second frequency converters via a trunk; and wherein said filtering control section is connected to said variable band-pass filters via a trunk.

9. The signal receiving apparatus according to claim 1, wherein said receiver comprising:

plural receive tuners each of which receives only a signal of a desired frequency, in response to respective signals frequency-converted by said plural second frequency converters.

10. A signal receiving system comprising:

(a) at least one signal receiving apparatus including
   a receiver antenna for receiving a plurality of high-frequency signals,
   a plurality of first frequency converters each for converting the frequency of a corresponding one of said high-frequency signals into a predetermined lower frequency,
   a plurality of second frequency converters each for further converting said predetermined lower frequency of said corresponding signal, which is converted by the corresponding first frequency converter, and
   a plurality of receivers each for receiving only a signal of a desired frequency among signals whose frequencies are converted by said second frequency converters; and (b) a receive frequency control unit including
   a frequency control information storage section, connected to said signal receiving apparatus via an information transmission line, for storing frequency control information, which is to be used for the frequency conversion by said second frequency converters, and
   a frequency-conversion control section for automatically controlling the frequency conversion by said second frequency converters based on said frequency control information stored in said frequency control information storage section;
   wherein each said second frequency converter includes a variable oscillator for generating a variable frequency signal under control by said frequency-conversion control section, and a frequency converter for further converting said resultant signal, which is the output of said first frequency converter, using said variable frequency signal generated by said variable oscillator.

11. A signal receiving system comprising:

(a) at least on e signal receiving apparatus including
   a receiver antenna for receiving a plurality of high-frequency signals,
   a plurality of first frequency converters each for converting the frequency of each of said high-frequency signals into a predetermined lower frequency,
   a plurality of second frequency converters each for further converting said predetermined lower frequency of said corresponding signal, which is converted by the corresponding first frequency converter,
   a plurality of variable band-pass filters each for subjecting the signal, which is converted by said corresponding second frequency converter, to a filtering process to remove undesired frequency components and to pass only signal components of said desired frequency, and
   a plurality of receivers each for receiving only a signal of a desired frequency among input signals passed through said variable band-pass filters; and a receive frequency control unit including
   a frequency control information storage section, connected to said signal receiving apparatus via an information transmission line, for storing frequency control information, which is to be used for the frequency conversion by said second frequency converters, and
   a frequency-conversion control section for automatically controlling the frequency conversion of said second frequency converters based on said frequency control information stored in said frequency control information storage section,
   a filtering control information storage section for storing filtering control information, which is to be used for the filtering process by said variable band-pass filters, and
   a filtering control section for automatically controlling the filtering process by said variable band-pass filters based on said filtering control information stored in said filtering control information storage section;
   wherein each said second frequency converter includes a variable oscillator for generating a variable frequency signal under control by said frequency-conversion control section, and a frequency converter for further converting said resultant signal, which is the output of said first frequency converter, using said variable frequency signal generated by said variable oscillator.

* * * * *

UNITED STATES PATENT AND TRADEMARK OFFICE
CERTIFICATE OF CORRECTION

PATENT NO. : 6,011,597
DATED : January 4, 2000
INVENTOR(S) : Kazuharu KUBO

It is certified that error appears in the above-indentified patent and that said Letters Patent is hereby corrected as shown below:

On the title page; item [30] should be corrected to read as follows:

August 6, 1996

Signed and Sealed this

Fifth Day of December, 2000

Attest:

Attesting Officer

Q. TODD DICKINSON

Director of Patents and Trademarks